United States Patent
Bennati

(10) Patent No.: US 11,645,730 B2
(45) Date of Patent: May 9, 2023

(54) METHOD, APPARATUS, AND COMPUTER PROGRAM PRODUCT FOR IDENTIFYING PRIVACY RISKS IN DATASETS

(71) Applicant: HERE GLOBAL B.V., Eindhoven (NL)

(72) Inventor: Stefano Bennati, Zurich (CH)

(73) Assignee: HERE GLOBAL B.V., Eindhoven (NL)

( * ) Notice: Subject to any disclaimer, the term of this patent is extended or adjusted under 35 U.S.C. 154(b) by 226 days.

(21) Appl. No.: 17/099,144

(22) Filed: Nov. 16, 2020

(65) Prior Publication Data

US 2022/0156869 A1 May 19, 2022

(51) Int. Cl.

| | |
|---|---|
| *G06Q 50/26* | (2012.01) |
| *G06F 21/62* | (2013.01) |
| *G06Q 10/06* | (2012.01) |
| *H04L 9/40* | (2022.01) |
| *G06F 16/2455* | (2019.01) |
| *G06Q 10/0635* | (2023.01) |
| *H04W 4/02* | (2018.01) |

(52) U.S. Cl.
CPC ..... *G06Q 50/265* (2013.01); *G06F 16/24556* (2019.01); *G06F 21/6254* (2013.01); *G06Q 10/0635* (2013.01); *H04W 4/02* (2013.01)

(58) Field of Classification Search
CPC .. G06Q 50/265; G06Q 50/26; G06Q 10/0635; G06Q 10/06; G06F 16/24556; G06F 16/2455; G06F 21/6254; G06F 21/62; H04W 4/02; H04W 12/02; H04W 4/029; H04L 63/1433

See application file for complete search history.

(56) References Cited

U.S. PATENT DOCUMENTS

| | | | |
|---|---|---|---|
| 9,199,930 B2* | 12/2015 | Murugan | C07C 213/08 |
| 9,547,845 B2 | 1/2017 | Agrawal et al. | |
| 10,769,306 B2* | 9/2020 | Antonatos | G06F 16/285 |
| 2013/0198194 A1* | 8/2013 | Chen | G06F 21/6254 |
| | | | 707/E17.089 |
| 2013/0261954 A1* | 10/2013 | Boschker | G01C 21/3844 |
| | | | 701/410 |
| 2015/0163252 A1* | 6/2015 | Bhatti | G16H 10/60 |
| | | | 726/1 |

(Continued)

OTHER PUBLICATIONS

Extended European Search Report for European Application No. 21208314.1 dated Apr. 7, 2022, 7 pages.

(Continued)

*Primary Examiner* — Chris Parry
*Assistant Examiner* — Hassan A Khan
(74) *Attorney, Agent, or Firm* — Alston & Bird LLP

(57) ABSTRACT

Embodiments described herein relate to establishing a privacy risk score between two datasets based on features common to the datasets. Methods may include: receiving a first dataset of probe data points defining a trajectory; receiving a second dataset of the probe data points defining the trajectory; identifying a plurality of features common to the first dataset and the second dataset; computing a privacy risk value for the identified features common to the first dataset and the second dataset; and computing an aggregate privacy risk score between the first dataset and the second dataset.

12 Claims, 15 Drawing Sheets

(56) References Cited

U.S. PATENT DOCUMENTS

| | | | | |
|---|---|---|---|---|
| 2015/0350890 | A1* | 12/2015 | Arunkumar | H04W 12/02 |
| | | | | 455/411 |
| 2016/0150361 | A1* | 5/2016 | Zhu | H04W 4/02 |
| | | | | 455/456.1 |
| 2017/0169253 | A1* | 6/2017 | Curcio | G06F 21/6263 |
| 2018/0188053 | A1* | 7/2018 | Fukuda | H04W 4/024 |
| 2019/0236309 | A1* | 8/2019 | Gkoulalas-Divanis | |
| | | | | G06F 21/6245 |
| 2019/0370497 | A1* | 12/2019 | Gkoulalas-Divanis | |
| | | | | G06K 9/623 |
| 2019/0373403 | A1* | 12/2019 | Ajmeri | H04W 4/021 |
| 2020/0068350 | A1* | 2/2020 | Chai | G06N 5/003 |
| 2020/0327252 | A1* | 10/2020 | McFall | G06F 21/78 |
| 2021/0012028 | A1* | 1/2021 | Cabot | G06F 17/18 |
| 2021/0019425 | A1* | 1/2021 | Ostadzadeh | H04W 12/00 |
| 2021/0104332 | A1* | 4/2021 | Kåberg Johard | G16H 50/50 |
| 2021/0240851 | A1* | 8/2021 | Badalone | G06F 21/60 |
| 2021/0326652 | A1* | 10/2021 | Hazard | G06N 20/00 |
| 2022/0067199 | A1* | 3/2022 | Taber | G06F 21/6236 |
| 2022/0067200 | A1* | 3/2022 | Taber | G06F 21/6245 |
| 2022/0067203 | A1* | 3/2022 | Pottier | G06F 11/3692 |
| 2022/0075897 | A1* | 3/2022 | Epasto | G06F 21/6254 |
| 2022/0171879 | A1* | 6/2022 | Patel | G16H 80/00 |
| 2022/0222373 | A1* | 7/2022 | Villax | G06F 21/6254 |

OTHER PUBLICATIONS

Hasan et al., "An Effective Privacy Architecture to Preserve User Trajectories in Reward-Based LBS Applications", ISPRS International Journal of Geo-Information 7(2) (2018), 16 pages.

Kopanaki et al., "Who Cares About Others' Privacy: Personalized Anonymization of Moving Object Trajectories", Proc. 19th International Conference on Extending Database Technology (EDBT), (Mar. 2016), pp. 425-436.

Shokri et al., "A Distortion-Based Metric for Location Privacy", WPES '09: Proceedings of the 8th ACM Workshop on Privacy in the Electronic Society (Nov. 2009), 10 pages.

\* cited by examiner

| Symbol | Meaning |
|---|---|
| $T$ | The trajectory dataset |
| $tr_i$ | One trajectory |
| $ID_i$ | A pseudonym associated to trajectory $tr_i$ |
| $p_i^j$ | A record of trajectory $tr_i$ |
| $t_j$ | The time component of record $p_i^j$ |
| $s_j$ | The spatial component, i.e. a pair of lat,lon coordinates |
| $y_j$ | Additional attributes of record $p_i^j$ |
| $eq_\alpha$ | An equivalence area |
| $\in eq_\alpha$ | The property of matching with the equivalence area $eq_\alpha$ |
| $tr_i^O$ | The origin of trajectory $tr_i$, i.e. its first record |
| $tr_i^D$ | The destination of trajectory $tr_i$, i.e. its last record |
| $M_\alpha$ | The set of trajectories that match with equivalence area $eq_\alpha$ |
| $k_\alpha$ | The number of trajectories matching with $M_\alpha$ |
| $I_\alpha$ | The set of inferences of trajectories in $M_\alpha$ |
| $l_\alpha$ | The number of equivalence classes inferred from $M_\alpha$ |
| $e_G$ | The size of the grid / equivalence areas |
| $e_A$ | The ability of the adversary |
| $P$ | The distribution of sensitive attribute values i.e. $I_\alpha$, for every equivalence area $eq_\alpha$ |
| $Q$ | The distribution of sensitive attribute values i.e. $I_\alpha$, for a specific equivalence area $eq_q$ |
| $H[X]$ | The entropy of distribution X |
| $H[X,Y]$ | The cross-entropy of distributions X and Y |

FIG. 5

| Row # | Raw data | Anon data | Score |
|---|---|---|---|
| 1 | k=1 | k=1 | 0 |
| 2 | k>1 | k>1 | 0 |
| 3 | k=1 | k>1 | 1 |
| 4 | k>1 | k=1 | -1 |

FIG. 11

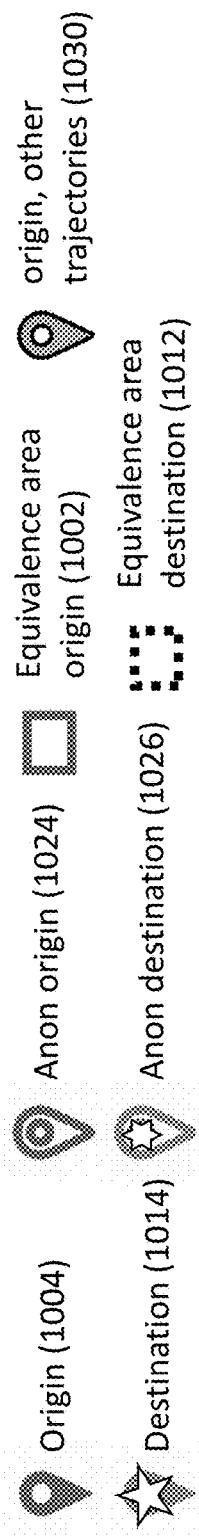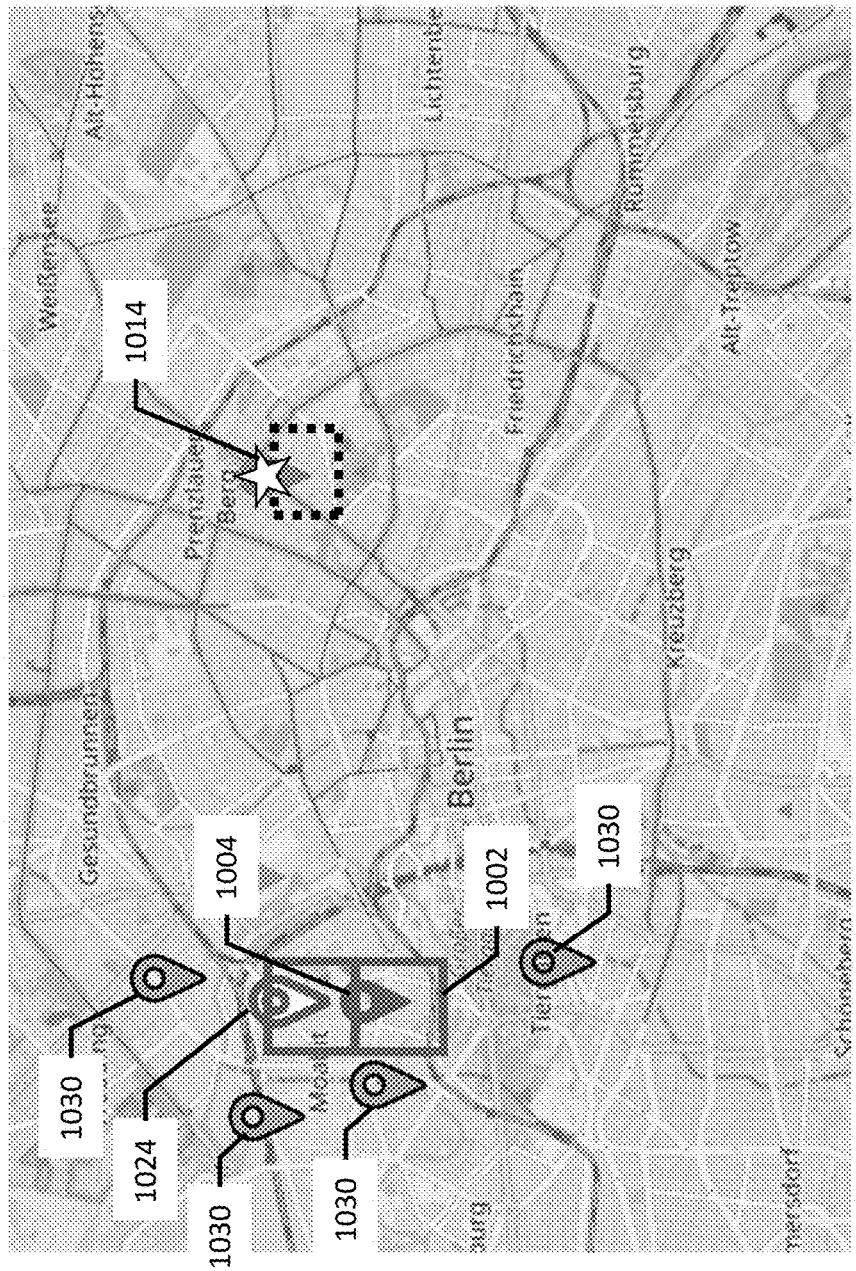
FIG. 12

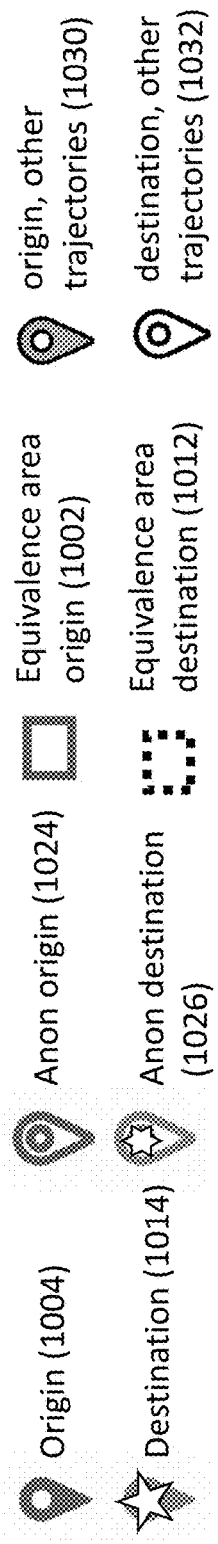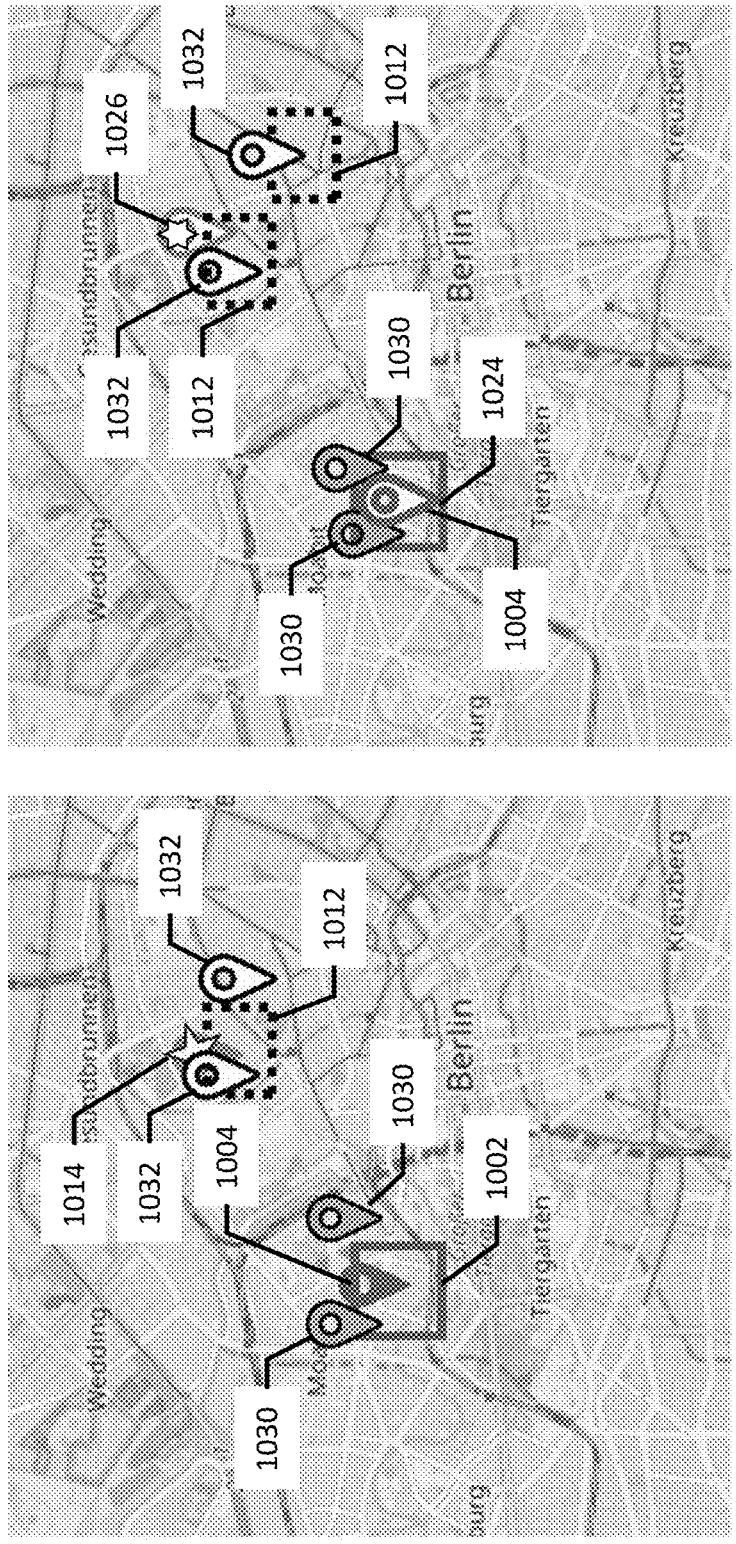
FIG. 13

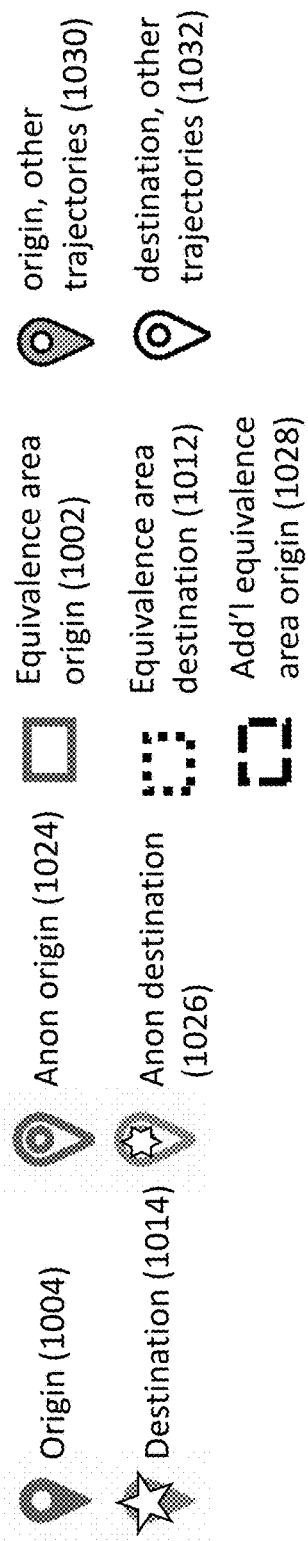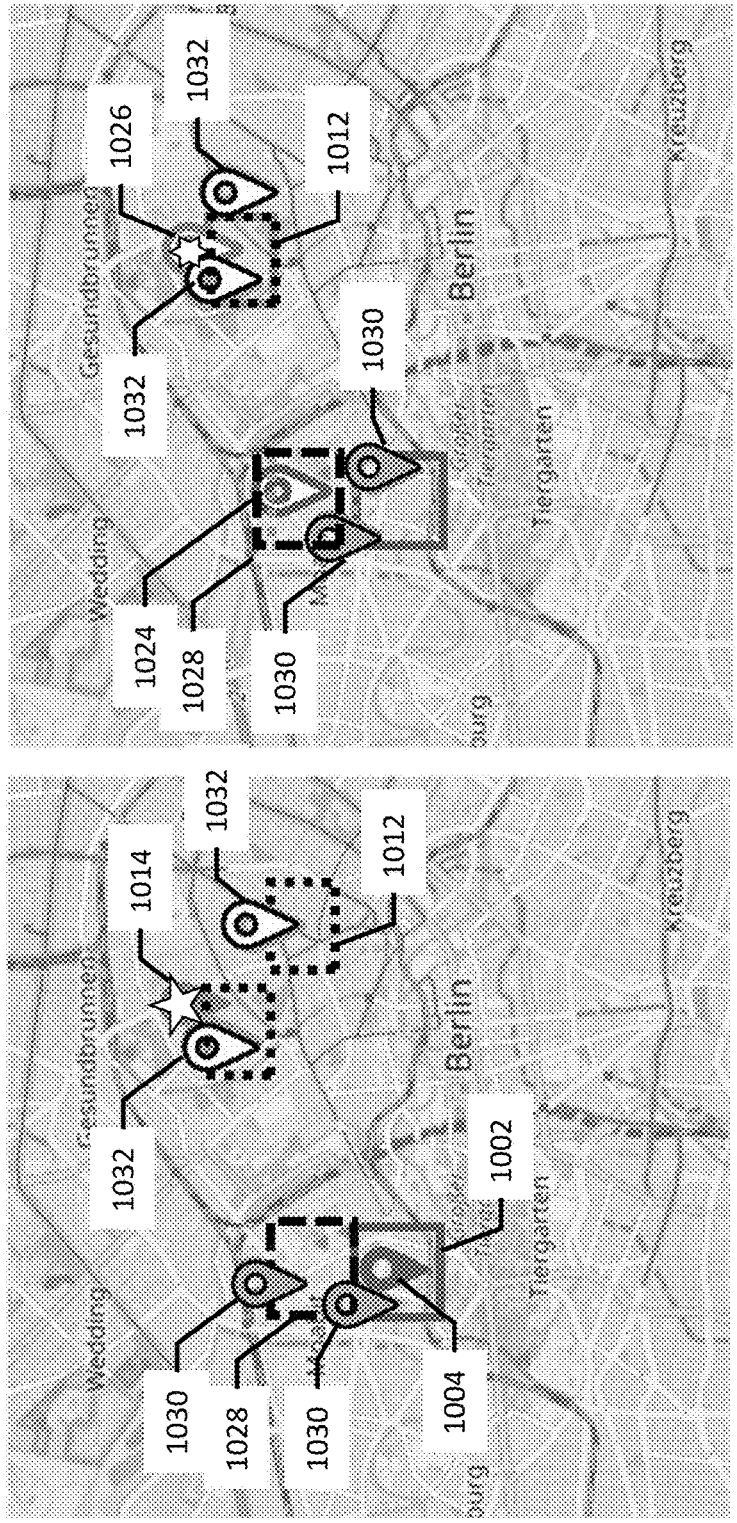
FIG. 14

METHOD, APPARATUS, AND COMPUTER PROGRAM PRODUCT FOR IDENTIFYING PRIVACY RISKS IN DATASETS

TECHNOLOGICAL FIELD

An example embodiment of the present disclosure relates to analyzing datasets to determine privacy risks within the datasets, and more particularly, to establishing a privacy risk score between two datasets based on features common to the datasets.

BACKGROUND

Service providers and device manufacturers (e.g., wireless, cellular, navigation, etc.) are continually challenged to deliver value and convenience to consumers by providing compelling and useful services. Location-based services have been developed to provide users with useful and relevant information regarding route planning and to facilitate route guidance along the way. Substantially static data regarding roadways is used in conjunction with dynamic data, such as traffic, construction, and incident information to provide accurate and timely information to a driver to help route planning and decision making.

Data received from infrastructure monitoring systems and crowd-sourced data has become ubiquitous and may be available for facilitating route guidance and navigation system information. However, this data can be mined to provide various other services to users and to grow the availability of location-based services. The provision of location-based services is dependent upon understanding the location of a user requesting the services. Maintaining anonymity while also being able to access location-based services is a challenge.

BRIEF SUMMARY

A method, apparatus, and computer program product are provided in accordance with an example embodiment described herein for analyzing datasets to determine privacy risks within the datasets, and more particularly, to establishing a privacy risk score between two datasets based on features common to the datasets. According to an example embodiment, an apparatus is provided including at least one processor and at least one memory including computer program code, the at least one memory and computer program code configured to, with the processor, cause the apparatus to at least: receive a first dataset of probe datapoints defining a trajectory; receive a second dataset of the probe data points defining the trajectory; identify a plurality of features common to the first dataset and the second dataset; compute a privacy risk value for the identified features common to the first dataset and the second dataset; aggregate the privacy risk values for the identified features common to the first dataset and the second dataset; and compute an aggregated privacy risk score between the first dataset and the second dataset.

The second dataset of the probe datapoints defining the trajectory may be an anonymized dataset anonymized using a first anonymization algorithm, where the apparatus of an example embodiment may be caused to: determine if the aggregate privacy risk score satisfies a predetermined value; and in response to the aggregate privacy risk score failing to satisfy the predetermined value, provide for anonymization of the first dataset of the probe datapoints using a second anonymization algorithm to generate an anonymized third dataset. The second dataset of the probe data points defining the trajectory may be an anonymized dataset anonymized using an anonymization algorithm, where the apparatus of some embodiments is further caused to: determine if the aggregate privacy risk score satisfies a predetermined value; and in response to the aggregate risk score satisfying the predetermined value, release the second database for provision of location-based services.

The apparatus of example embodiments may be caused to: determine if the aggregate privacy risk score satisfies a predetermined value; and in response to the aggregate privacy risk score satisfying the predetermined value, provide for disclosure of the second dataset. The apparatus may be caused to receive location-based services in response to disclosure of the second dataset. The features common to the first dataset and the second dataset may include equivalence areas, where equivalence areas include spatio-temporal regions for an origin and a destination of the first dataset and the second dataset. The plurality of features may include equivalence areas and trajectories. Causing the apparatus to compute a privacy risk value for features common to the first dataset and the second dataset may include causing the apparatus to: conduct a pair-wise comparison of privacy risk values between the first dataset and the second dataset inside the identified equivalency areas; and where causing the apparatus to aggregate the privacy risk values for the identified features common to the first dataset and the second dataset include causing the apparatus to aggregate a result of the pair-wise comparison of privacy risk values between the first dataset and the second dataset.

Embodiments provided herein include a computer program product having at least one non-transitory computer-readable storage medium with computer-executable program portions stored therein, the computer-executable program code portions including program code instructions to: receive a first dataset of probe data points defining a trajectory; receive a second dataset of the probe data points defining the trajectory; identify a plurality of features common to the first dataset and the second dataset; compute a privacy risk value for the identified features common to the first dataset and the second dataset; aggregate the privacy risk values for the identified features common to the first dataset and the second dataset; and compute an aggregate privacy risk score between the first dataset and the second dataset.

According to some embodiments, the second dataset of the probe data points defining the trajectory is an anonymized dataset anonymized using a first anonymization algorithm, where the computer program product further includes program code instructions configured to: determine if the aggregate privacy risk score satisfies a predetermined value; and in response to the aggregate privacy risk score failing to satisfy the predetermined value, provide for anonymization of the first dataset of probe data points using a second anonymization algorithm to generate an anonymized third dataset. The second dataset of the probe data points defining the trajectory may be an anonymized dataset anonymized using an anonymization algorithm, where the computer program product further includes program code instructions configured to: determine if the aggregate risk score satisfies a predetermined value; and in response to the aggregate privacy risk score satisfying the predetermined value, release the second dataset for provision of location-based services.

The computer program product of some embodiments may include program code instructions to: determine if the aggregate privacy risk score satisfies a predetermined value;

and in response to the aggregate privacy risk score satisfying the predetermined value, provide for disclosure of the second dataset. Embodiments may include program code instructions configured to receive location-based services in response to disclosure of the second dataset. The features common to the first dataset and the second dataset may include equivalence areas, where equivalence areas include spatio-temporal regions for an origin and a destination of the first dataset and the second dataset. The plurality of features may include equivalence areas and trajectories. The program code instructions to compute a privacy risk value for the features common to the first dataset and the second dataset may include program code instructions to: conduct a pair-wise comparison of privacy risk values between the first dataset and the second dataset inside the identified equivalency areas; and where the program code instructions to aggregate the privacy risk values for the identified features common to the first dataset and the second dataset include program code instructions to aggregate a result of the pair-wise comparison of privacy risk values between the first dataset and the second dataset.

Embodiments provided herein include a method including: receiving a first dataset of probe data points defining a trajectory; receiving a second dataset of the probe data points defining the trajectory; identifying a plurality of features common to the first dataset and the second dataset; computing a privacy risk value for the identified features common to the first dataset and the second dataset; and computing an aggregate privacy risk score between the first dataset and the second dataset. The second dataset of the probe data points defining the trajectory may be an anonymized dataset anonymized using a first anonymization algorithm, where the method further includes: determining if the aggregate privacy risk score satisfies a predetermined value; and in response to the aggregate privacy risk score failing to satisfy the predetermined value, providing for anonymization of the first dataset of probe data points using a second anonymization algorithm to generate an anonymized third dataset.

According to an example embodiment, the second dataset of the probe data points defining the trajectory is an anonymized dataset anonymized using an anonymization algorithm, where the method further includes: determining if the aggregate privacy risk score satisfies a predetermined value; and in response to the aggregate privacy risk score satisfying the predetermined value, releasing the second dataset for provision of location-based services. Methods may include: determining if the aggregate privacy risk score satisfies a predetermined value; and in response to the aggregate privacy risk score satisfying the predetermined value, providing for disclosure of the second dataset.

Embodiments provided herein include an apparatus including: means for receiving a first dataset of probe data points defining a trajectory; means for receiving a second dataset of the probe data points defining the trajectory; means for identifying a plurality of features common to the first dataset and the second dataset; means for computing a privacy risk value for the identified features common to the first dataset and the second dataset; and means for computing an aggregate privacy risk score between the first dataset and the second dataset. The second dataset of the probe data points defining the trajectory may be an anonymized dataset anonymized using a first anonymization algorithm, where the apparatus further includes: means for determining if the aggregate privacy risk score satisfies a predetermined value; and in response to the aggregate privacy risk score failing to satisfy the predetermined value, means for providing for anonymization of the first dataset of probe data points using a second anonymization algorithm to generate an anonymized third dataset.

According to an example embodiment, the second dataset of the probe data points defining the trajectory is an anonymized dataset anonymized using an anonymization algorithm, where the apparatus further includes: means for determining if the aggregate privacy risk score satisfies a predetermined value; and in response to the aggregate privacy risk score satisfying the predetermined value, means for releasing the second dataset for provision of location-based services. The apparatus of example embodiments may include: means for determining if the aggregate privacy risk score satisfies a predetermined value; and in response to the aggregate privacy risk score satisfying the predetermined value, means for providing for disclosure of the second dataset.

BRIEF DESCRIPTION OF THE DRAWINGS

Figure 1:
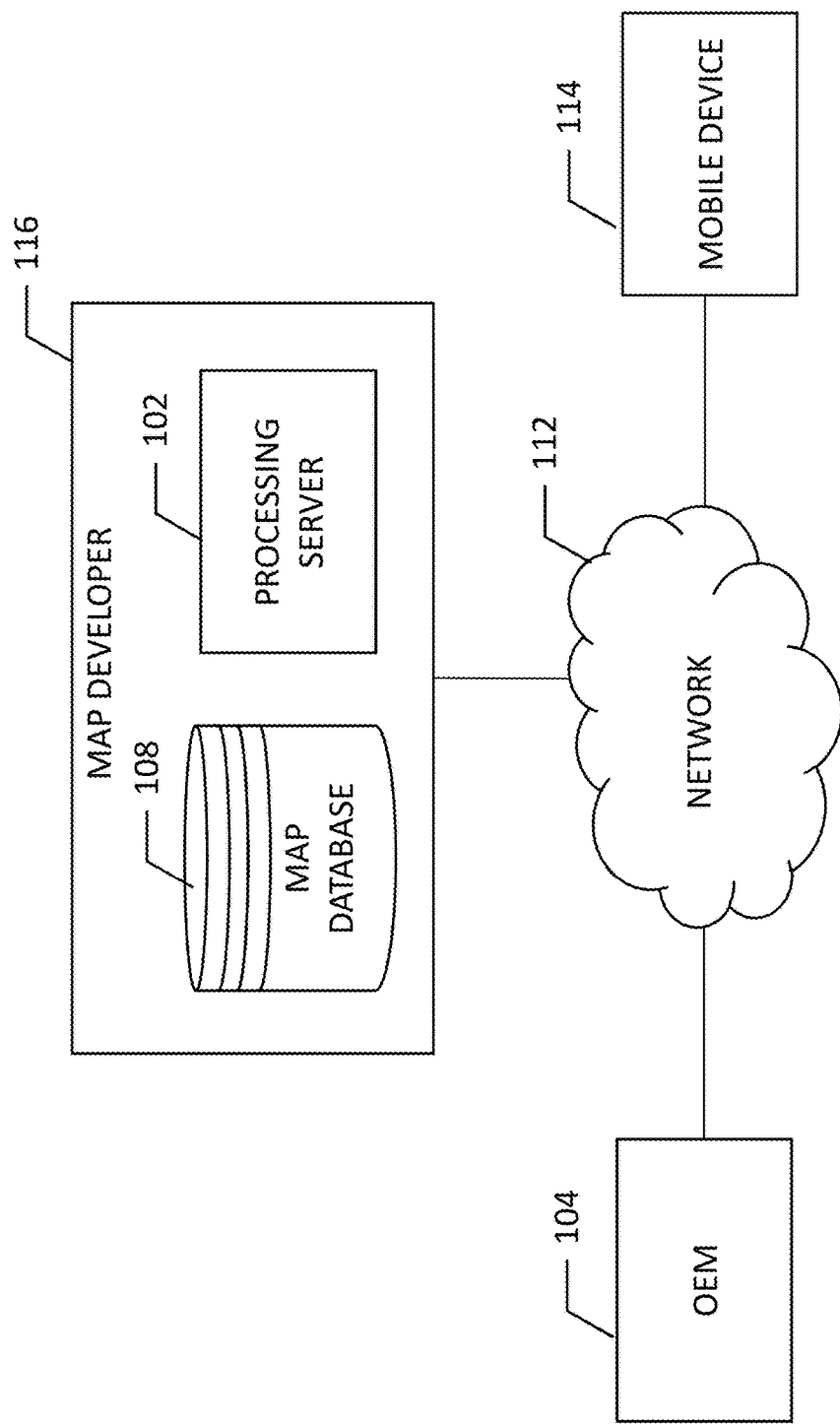
Figure 2:
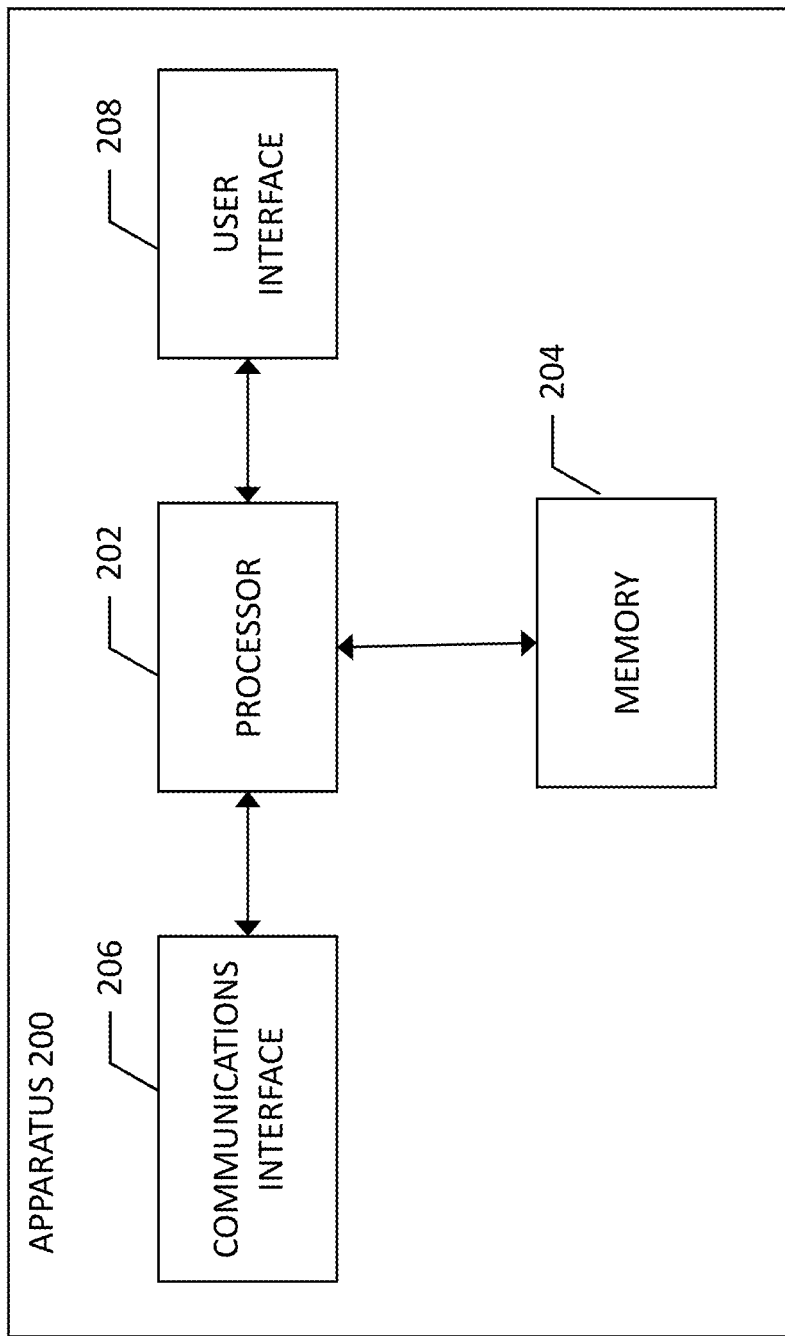
Figure 3:
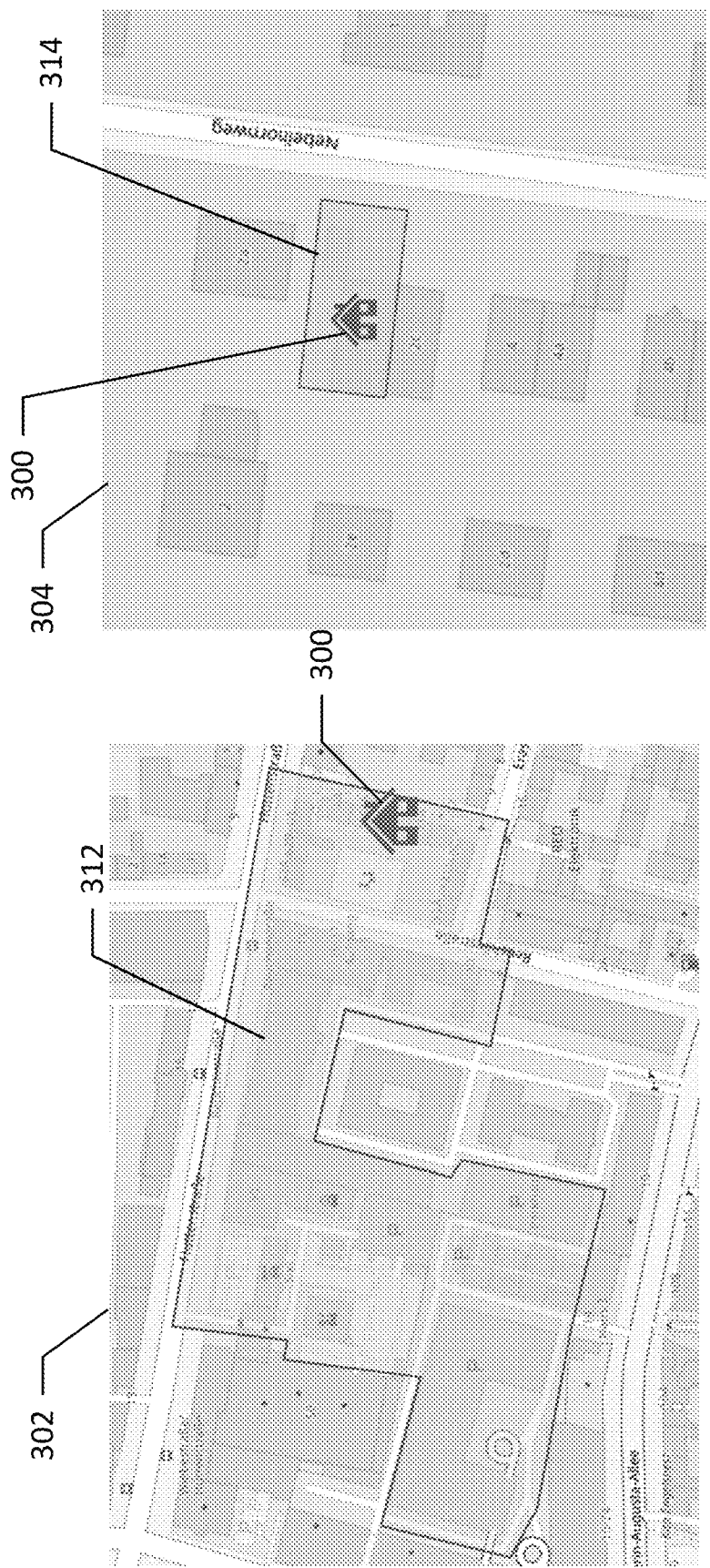
Figure 4:
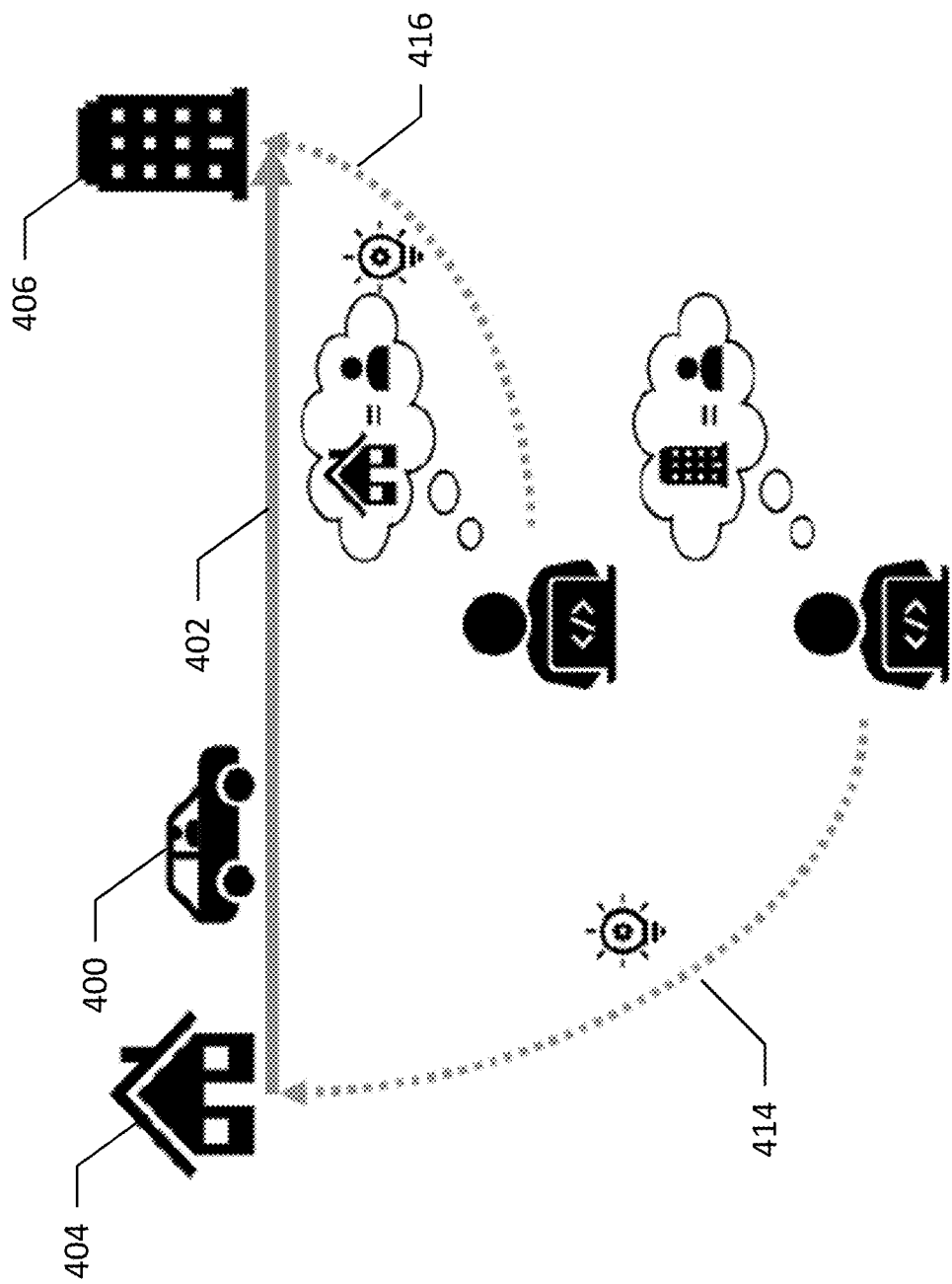
Figure 6:
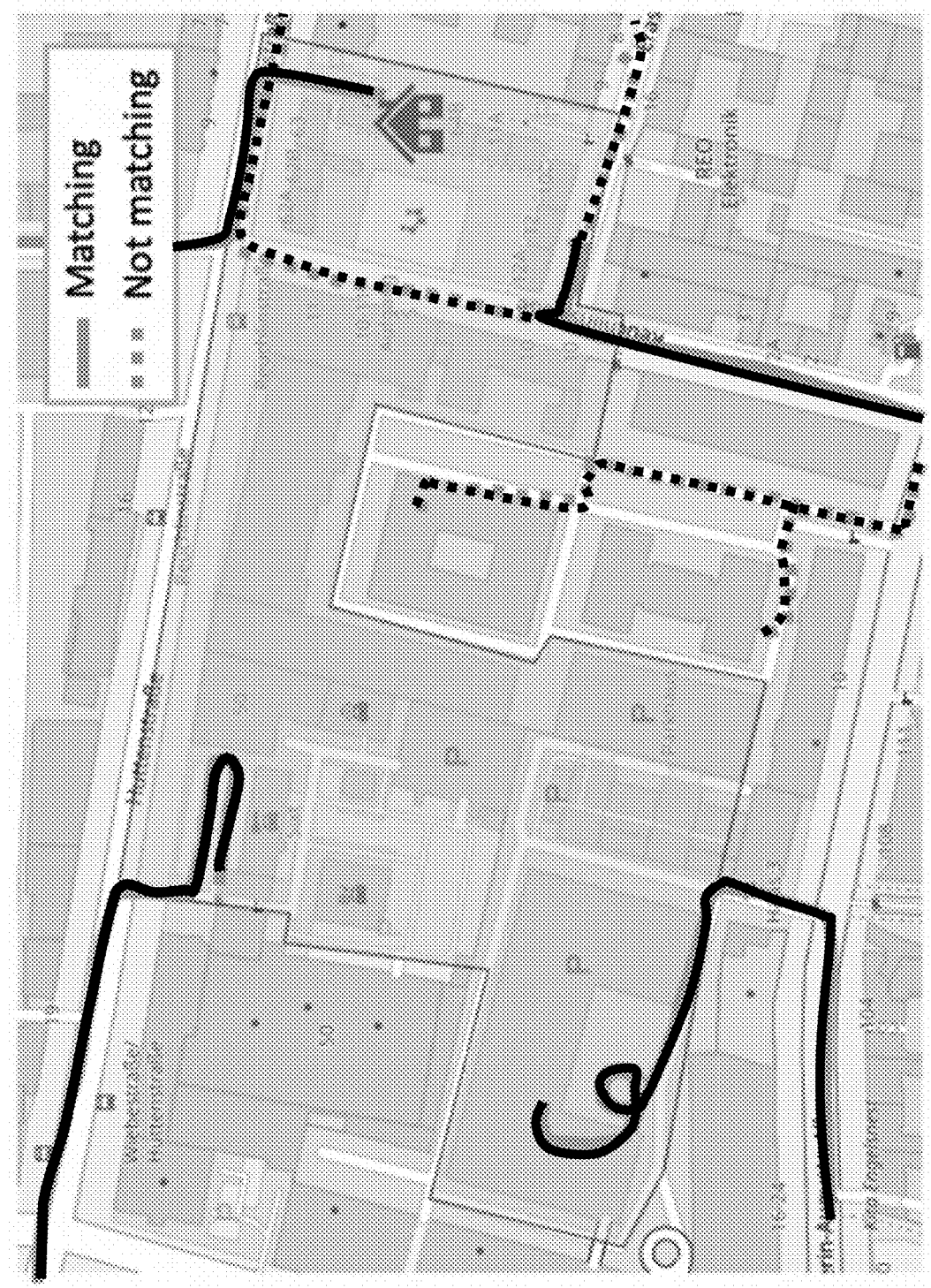
Figure 7:
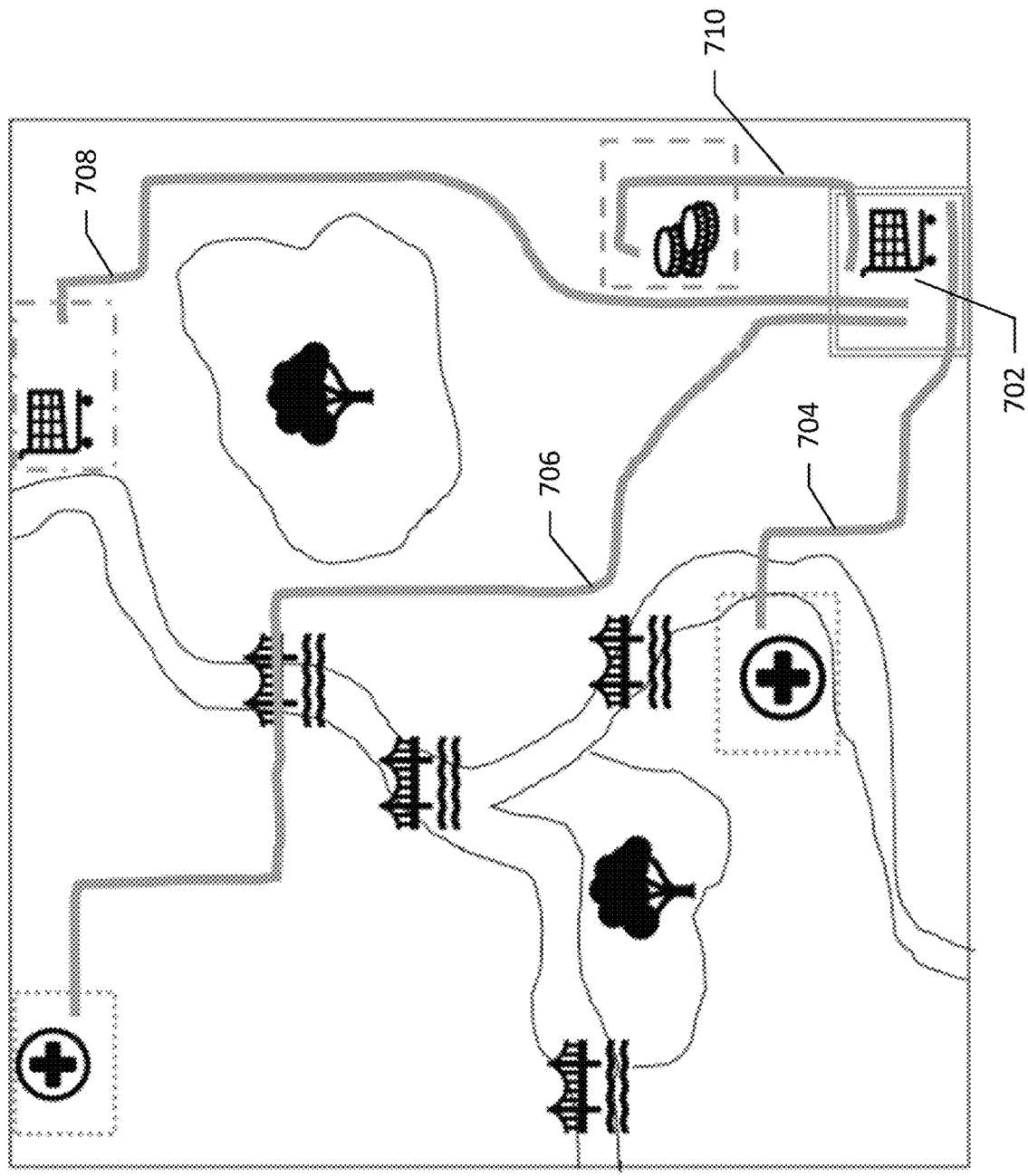
Figure 8:
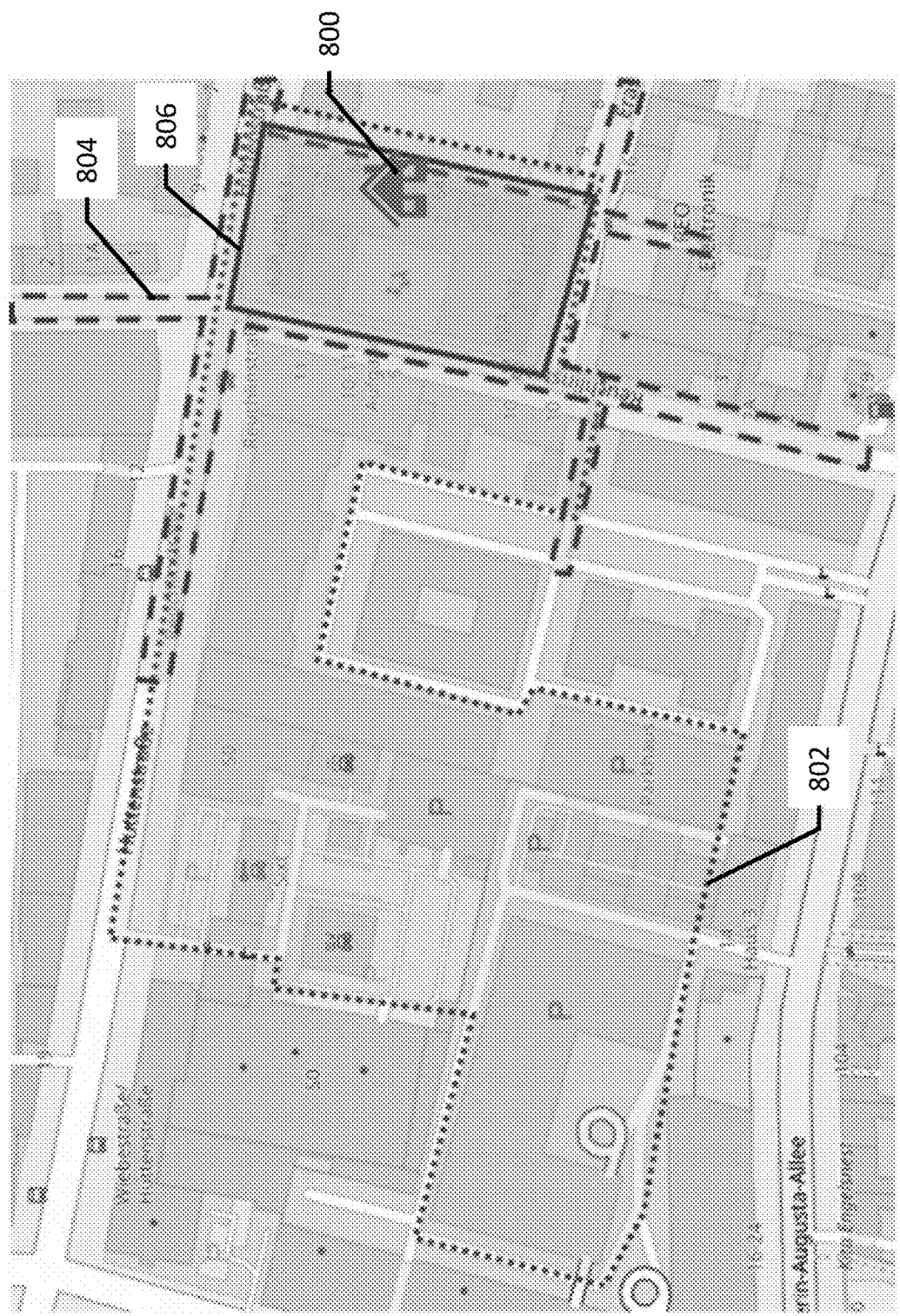
Figure 9:
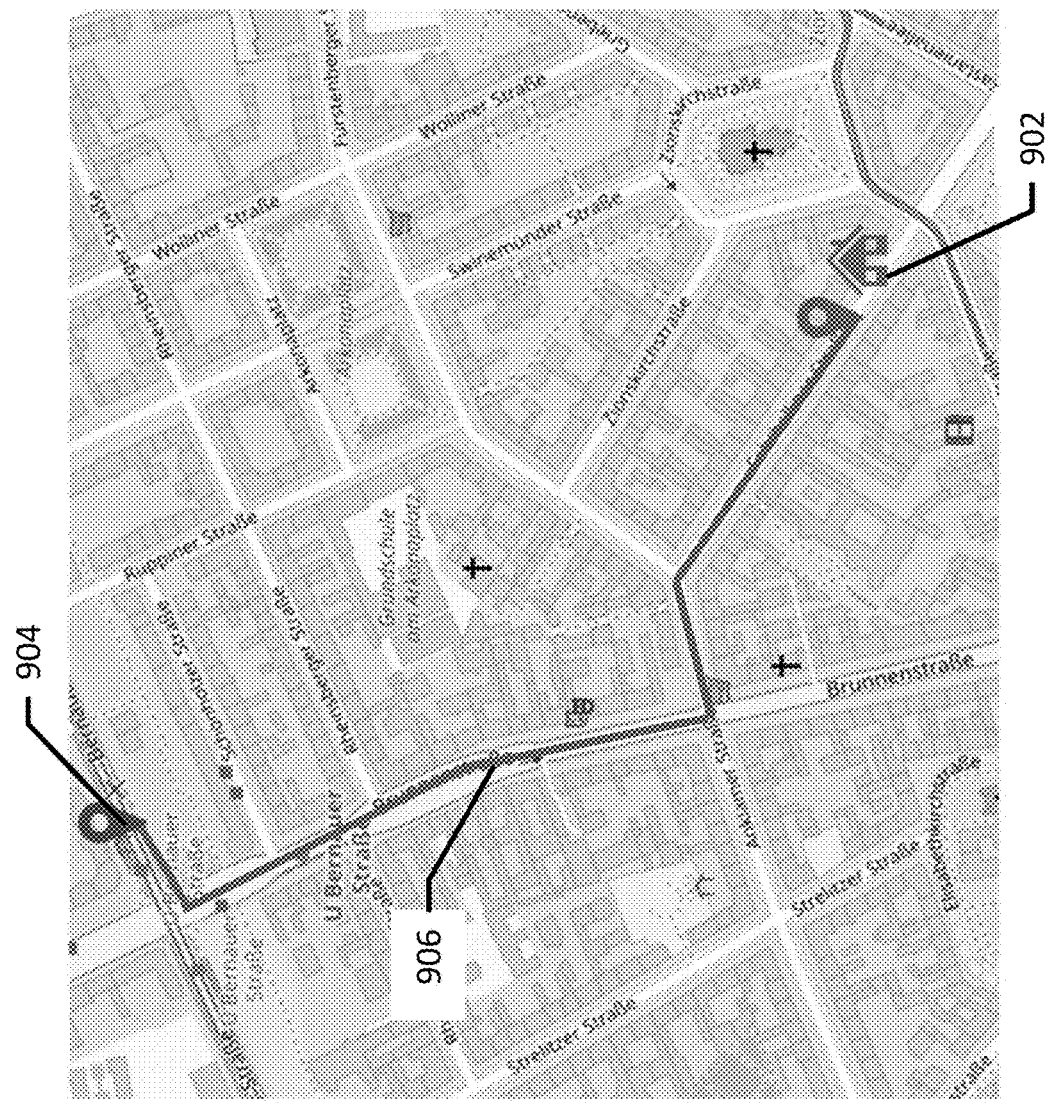
Figure 10:
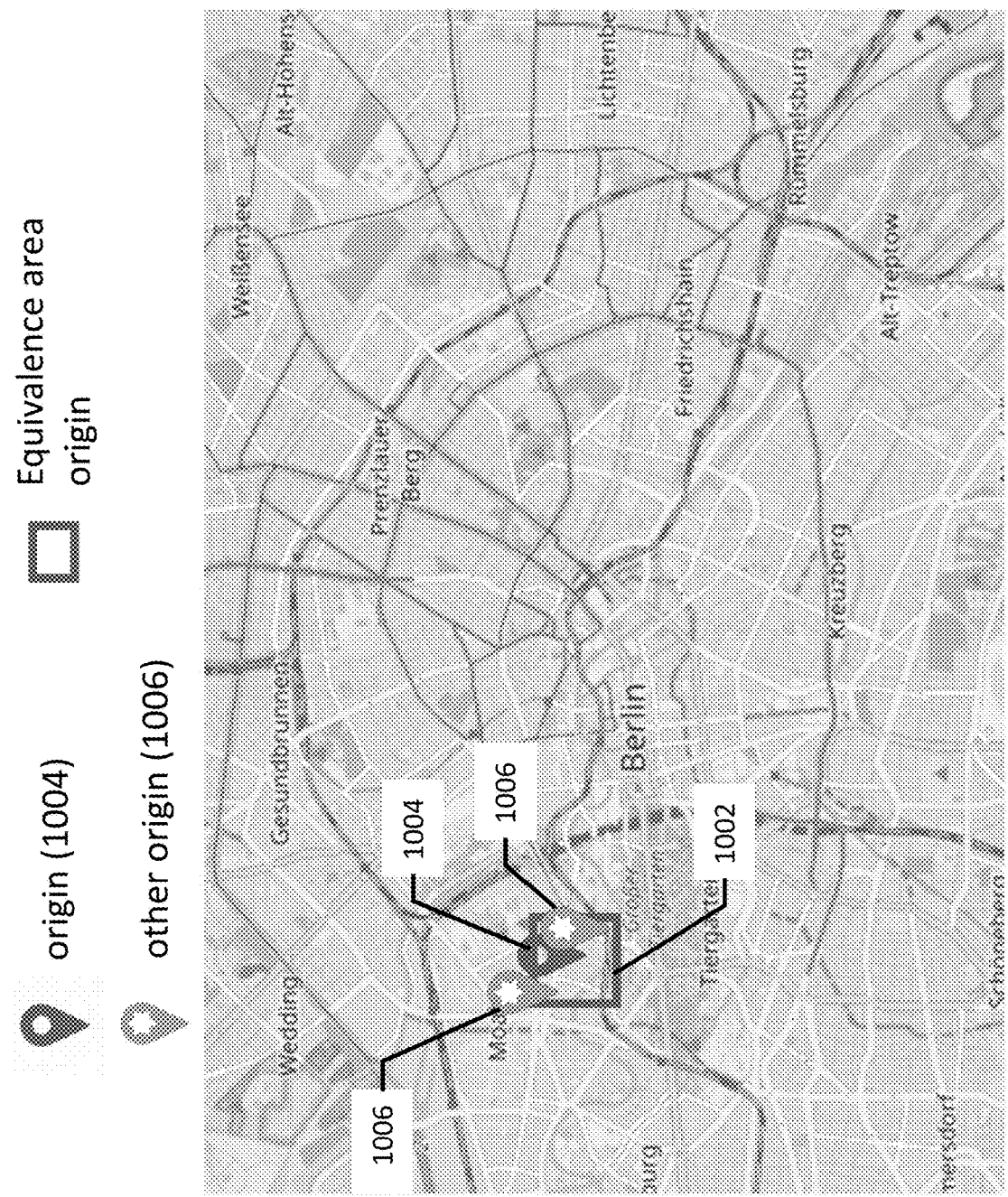
Figure 15:
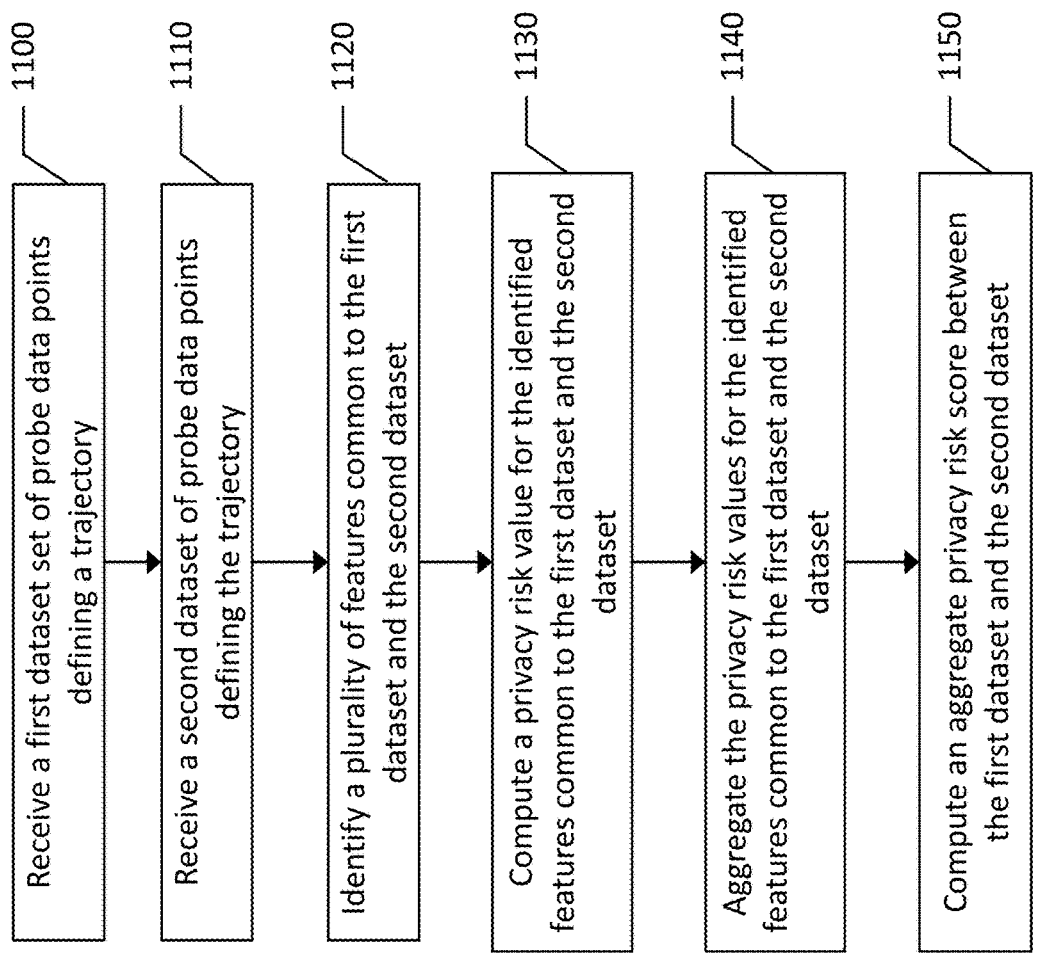

Having thus described example embodiments of the disclosure in general terms, reference will now be made to the accompanying drawings, which are not necessarily drawn to scale, and wherein:

FIG. 1 illustrates a communications diagram in accordance with an example embodiment of the present disclosure;

FIG. 2 is a block diagram of an apparatus that may be specifically configured for anonymizing trajectories generated from probe data and/or generating a privacy risk score for a dataset of probe data points in accordance with an example embodiment of the present disclosure;

FIG. 3 illustrates example embodiments of equivalence areas associated with different definitions of background knowledge according to an example embodiment of the present disclosure;

FIG. 4 illustrates an example embodiment of the double nature of location data according to an example embodiment of the present disclosure;

FIG. 5 is a table of symbol definitions according to example embodiments of the present disclosure;

FIG. 6 illustrates trajectories that may or may not match with an equivalence area according to another example embodiment of the present disclosure;

FIG. 7 illustrates a set of inferences for an equivalence area for which there are four matched trajectories according to an example embodiment of the present disclosure;

FIG. 8 illustrates equivalence areas obtained by differently skilled adversaries according to an example embodiment of the present disclosure;

FIG. 9 illustrates an example embodiment of an attack scenario from an adversary attempting to associate a trajectory with a target according to an example embodiment of the present disclosure;

FIG. 10 illustrates an example embodiment in which an equivalence area exists for a target's origin according to an example embodiment of the present disclosure;

FIG. 11 illustrates a table of scenarios and the respective privacy score afforded each scenario according to an example embodiment of the present disclosure;

FIG. 12 illustrates an example embodiment of a positive privacy change whereby the equivalence area of the anonymized origin is different from the equivalence area of the target origin, and a plurality of other trajectory origins exist around the target origin according to an example embodiment of the present disclosure;

FIG. 13 illustrates another example embodiment of an improvement to the privacy score through anonymization whereby after anonymization, several trajectory origins are within the same equivalence area as the target origin rendering re-identification difficult according to an example embodiment of the present disclosure;

FIG. 14 illustrates a negative privacy change whereby before anonymization, the raw data includes an origin within an equivalence area proximate another trajectory origin and proximate another equivalence area having another trajectory origin according to an example embodiment of the present disclosure; and FIG. 15 is a flowchart of a method for generating a privacy score for a second dataset relative to a first dataset according to an example embodiment of the present disclosure.

DETAILED DESCRIPTION

Some embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present disclosure.

Mobility data may be defined as a set of points or probe data points, each of which includes at least a latitude, longitude, and timestamp. Additional information may be associated with the probe data points, such as speed, heading, or other data. A trajectory includes a set of probe data points, where probe data points of a trajectory may include a trajectory identifier that associates the probe data points with one another. Mobility data captured in trajectories can be partitioned in a set of trajectories (trajectory data), each of which identifies the movement of a user over time. A single trajectory might 'observe' events as it passes through a specific location in the road network and record data about the event. This mobility data may provide sufficient information to an adversary to identify the source of the trajectory data and to identify movements, habits, home address, work address, children's school address, and other information to an adversary. As such, the mobility data from users is anonymized to prevent unauthorized or unwanted invasion of privacy. However, anonymization is balanced with identification of location information for purposes of location-based services, such that anonymization of mobility data is a complex process to achieve sufficient privacy while affording valuable location-based services.

Because location information is temporary and fleeting, identifying the location of a user may only be valuable for a small window of time around the time that the mobility data was collected for certain types of services. Because of this, an additional constraint is that anonymization must be performed in almost-real-time (e.g., anonymized data must be released with a short delay). For this to happen, privacy-enhancing anonymization algorithms must decide what mobility data to keep and what to discard to maximize the accuracy of location-based services while minimizing the associated risks for the privacy of a user. Location-based service providers or mobility data providers may apply privacy-enhancing algorithms on mobility data. Measures of privacy risk are needed to determine the effectiveness of anonymization and to tune the privacy-utility trade-off.

A method, apparatus, and computer program product are provided herein in accordance with an example embodiment for measuring the change of privacy risk that anonymization brings to a trajectory dataset. Anonymization metrics determine the privacy risk for a trajectory or set of trajectories. For example, k-anonymity determines how many trajectories in a dataset share some property that makes them indistinguishable by an adversary. Such metrics determine an absolute value for privacy risk, and these values are generally difficult to compare across datasets. For example, the number of trajectories, density, equivalence criteria, etc. in two datasets may vary significantly. The concept of k-anonymity was developed to take person-specific field-structured data and produce anonymized data with scientific guarantees that the individuals who are the subjects of the data cannot be re-identified while substantially retaining the usefulness of the data. The produced data is said to have the k-anonymity property if the information for each person contained therein cannot be distinguished from at least k−1 individuals whose information is in the release.

The metric of anonymity delta has the purpose to measure the change in privacy risk between two datasets—the raw and anonymized versions of the same dataset. A transformation may transform the first, raw dataset into the second, anonymized dataset. The transformation may be an anonymization algorithm or a function that swaps one dataset with another. The metric may assign a positive or negative score to each component of the data (e.g., individual trajectories), based on whether the anonymity of that component increased or decreased after applying the transformation. These scores can then be aggregated to compute the dataset score. By computing the score on each component (e.g., on a subset of the data), the conditions of the comparison are kept as uniform as possible, which limits the issues with using an absolute metric. For example, this allows comparison more accurately between datasets with different densities.

Mobility data sharing may be beneficial for a user, particularly for use with location-based services. Location-based services are useful to a variety of consumers who may employ location-based services for a wide range of activities. Services such as the identification of traffic location and density, providing information regarding goods and services available in a specific location, and identifying a target group of consumers in a particular location or who travel along a particular path, are among many other location-based services.

While location-based services are desirable for both consumers and for service providers, consumers are often concerned with the amount of information shared about their routines and activities. Thus, while consumers and service providers want to engage with location-based services, consumers generally desire to maintain some degree of privacy. Embodiments described herein introduce a metric of anonymization delta that determines the change in anonymization between two datasets, e.g., the same dataset before and after anonymization. While example embodiments are described as determining a change in anonymization between a raw dataset and an anonymized dataset, embodiments may be applied to two raw datasets to establish the privacy risk of one relative to the other. Two datasets to compare, as described according to an example embodiment herein, are generated by applying an anonymization algorithm to a first raw dataset to obtain the second anonymized dataset. Features are identified that are present in both datasets and remain for the most part consistent between datasets. These features may include the trajectories and equivalence areas. Equivalence areas are spatio-temporal regions where contained trajectories are not distinguishable with respect to each other. Features present in the dataset may include features that are not in the raw trajectory data itself. For example, features may include features that are map objects in map data, where trajectory data may indicate the trajectory passes through or by a map object in the map data such that the map object is identified as a feature of the trajectory. A trajectory that passes by a park may not include the park (a point-of-interest) in the raw data; however, the raw data may include location information associated with the park. In this case, the dataset may include the park as a feature after the trajectory data has been associated with another data source, such as map data. Regions can be defined when computing the k-anonymity metric, where trajectories in these regions are similar to each other. An absolute privacy risk is computed for each of these features for both datasets. The absolute risk values may then be compared on each feature and transformed into a relative value: positive/negative if the privacy risk is increased/decreased in the anonymized data with respect to the raw data. The relative values are aggregated over all features and a relative score for the pair of datasets is computed.

The selection of features in the datasets for comparison is critical as absolute metrics lose meaning when computed on different datasets. Using k-anonymity depends on the definition of equivalence areas, making criteria for equivalence areas looser leads to a higher k-anonymity, but do not translate to an effective decrease in privacy risk. K-anonymity depends on the number of trajectories, such that increasing the number of trajectories by splitting leads to higher k-anonymity, but does not necessarily translate to an equivalent decrease in privacy risk. Some features might limit the kinds of anonymization algorithms that can be applied. For example, splitting and gapping changes the number of trajectories so it cannot be used if trajectories are chosen as feature of reference.

Embodiments described herein provide a method, apparatus, and computer program product through which location information and more specifically, trajectory information can be gathered and shared in a manner that anonymizes the source of the information and makes unmasking of the source difficult. The degree of anonymity may be scored as a privacy score to quantify the risk of the source being re-identified from the anonymized data. Embodiments thereby use this score to determine if trajectory data is sufficiently anonymized to render it difficult to establish to whom the trajectory belongs while obtaining useful location-based trajectory information for use with location-based services.

To provide an improved manner of quantifying anonymization of mobility data, a system as illustrated in FIG. 1 may be used. FIG. 1 illustrates a communication diagram of an example embodiment of a system for implementing example embodiments described herein. The illustrated embodiment of FIG. 1 includes a map developer system 116, a processing server 102 in data communication with an original equipment manufacturer (OEM) 104 and/or a geographic map database, e.g., map database 108 through a network 112, and one or more mobile devices 114. The OEM may be one form of a trajectory source from which a trajectory of a probe or mobile device is received. The trajectory source may optionally include third party service providers or app developers, for example. The mobile device 114 may be associated, coupled, or otherwise integrated with a vehicle, such as in a vehicle's head unit, infotainment unit, or an advanced driver assistance system (ADAS), for example. Additional, different, or fewer components may be provided. For example, many mobile devices 114 may connect with the network 112. The map developer 116 may include computer systems and network of a system operator. The processing server 102 may include the map database 108, such as a remote map server. The network may be wired, wireless, or any combination of wired and wireless communication networks, such as cellular, Wi-Fi, internet, local area networks, or the like.

The OEM 104 may include a server and a database configured to receive probe data from vehicles or devices corresponding to the OEM. For example, if the OEM is a brand of automobile, each of that manufacturer's automobiles (e.g., mobile device 114) may provide probe data to the OEM 104 for processing. That probe data may be encrypted with a proprietary encryption or encryption that is unique to the OEM. The OEM may be the manufacturer or service provider for a brand of vehicle or a device. For example, a mobile device carried by a user (e.g., driver or occupant) of a vehicle may be of a particular brand or service (e.g., mobile provider), where the OEM may correspond to the particular brand or service. The OEM may optionally include a service provider to which a subscriber subscribes, where the mobile device 114 may be such a subscriber. While depicted as an OEM 104 in FIG. 1, other entities may function in the same manner described herein with respect to the OEM. For example, independent location-based service providers or other entities may participate and contribute in the same manner as described herein with respect to an OEM. As such, the OEM 104 illustrated in FIG. 1 is not limited to original equipment manufacturers, but may be any entity participating as described herein with respect to the OEMs.

The OEM 104 may be configured to access the map database 108 via the processing server 102 through, for example, a mapping application, such that the user equipment may provide navigational assistance to a user among other services provided through access to the map developer 116. According to some embodiments, the map developer 116 may function as the OEM, such as when the map developer is a service provider to OEMs to provide map services to vehicles from that OEM. In such an embodiment, the map developer 116 may or may not be the recipient of vehicle probe data from the vehicles of that manufacturer. Similarly, the map developer 116 may provide services to mobile devices, such as a map services provider that may be implemented on a mobile device, such as in a mapping application. According to such an embodiment, the map developer 116 may function as the OEM as the map developer receives the probe data from the mobile devices of users as they travel along a road network.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map developer. By way of example, the map developer can collect geographic data to generate and enhance the map database 108. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used to generate map geometries directly or through machine learning as described herein.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by mobile device 114, for example. The navigation-related functions can correspond to vehicle navigation, pedestrian navigation, or other types of navigation. While example embodiments described herein generally relate to vehicular travel, example embodiments may be implemented for bicycle travel along bike, watercraft travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., mobile device 114) to provide navigation and/or map-related functions. For example, the map database 108 may be used with the mobile device 114 to provide an end user with navigation features. In such a case, the map database 108 can be downloaded or stored on the end user device (mobile device 114) which can access the map database 108 through a wireless or wired connection, such as via a processing server 102 and/or the network 112, for example.

In one embodiment, the mobile device 114 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 114 for navigation and map functions such as guidance and map display, for example, and for determination of one or more personalized routes or route segments based on one or more calculated and recorded routes, according to some example embodiments.

An ADAS may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors.

Some advanced driver assistance systems may employ digital map data. Such systems may be referred to as map-enhanced ADAS. The digital map data can be used in advanced driver assistance systems to provide information about the road network, road geometry, road conditions, and other information associated with the road and environment around the vehicle. Unlike some sensors, the digital map data is not affected by the environmental conditions such as fog, rain, or snow. Additionally, the digital map data can provide useful information that cannot reliably be provided by sensors, such as curvature, grade, bank, speed limits that are not indicated by signage, lane restrictions, and so on. Further, digital map data can provide a predictive capability well beyond the driver's vision to determine the road ahead of the vehicle, around corners, over hills, or beyond obstructions. Accordingly, the digital map data can be a useful and sometimes necessary addition for some advanced driving assistance systems. In the example embodiment of a fully-autonomous vehicle, the ADAS uses the digital map data to determine a path along the road network to drive, such that accurate representations of the road are necessary, such as accurate representations of intersections and turn maneuvers there through.

The processing server 102 may receive probe data, directly or indirectly, from a mobile device 114, such as when the map developer is functioning as the OEM 104. Optionally, the map developer 116 may receive probe data indirectly from the mobile device 114, such as when the mobile device 114 provides probe data to the OEM 104, and the OEM provides certain elements of the probe data to the map developer 116. The OEM 104 may anonymize the probe data or otherwise process the probe data to maintain privacy of a user of the mobile device 114 before providing the data to the map developer 116. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102, either directly or indirectly, may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) may be representative of the location of a vehicle at a respective point in time and may be collected while a vehicle is traveling along a route. According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 and/or an OEM 104 may be embodied in an apparatus as illustrated in FIG. 2. The apparatus, such as that shown in FIG. 2, may be specifically configured in accordance with an example embodiment of the present disclosure for anonymizing trajectories of mobile devices, and more particularly, to segmenting a trajectory and introducing gaps between the trajectory segments or sub-trajectories based on tailored use cases to retain portions of the trajectory that have higher utility. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more user equipment 104 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna (s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Location-based service providers endeavor to collect as much location data as possible to maximize the accuracy of the location-based services, while attempting to minimize the associated risks for the privacy of the users particularly as it relates to the inadvertent disclosure or misuse of data. To reduce the privacy risk, location-based service providers may apply privacy-enhancing algorithms on data. Privacy-enhancing algorithms function by removing or altering features of the data that may remove privacy, and this operation typically renders the data less accurate and thus less valuable for the location-based service provider. Privacy enhancement becomes more difficult for services based on trajectory data, such as pick-up drop-off analysis, as conventional privacy measures do not consider the additional privacy risks introduced by mobility patterns correlated between locations. Embodiments provided herein address the issue of measuring privacy risks associated with revealing trajectory data to "honest-but-curious" service provider where the service provider may not have ill intent, but may be able to access the data and establish mobility data for an individual.

Embodiments described herein provide a metric for scoring privacy of the results of anonymization of a dataset through a comparison between a first dataset and a second dataset. According to an example embodiment, the first dataset of probe data points is a raw dataset and the second dataset of probe points is an anonymized dataset of the probe data points. Embodiments introduce a model of an adversary with imperfect knowledge that is based on the concept of equivalence classes and by adapting standard privacy measures for location data (e.g., k-anonymity, l-diversity, and t-closeness) to that scenario. Embodiments are able to measure privacy risk of any trajectory dataset independently of whether or how it is anonymized, and the ability to intuitively compare different datasets and different scenarios against standardized measures. Embodiments are useful to processors of trajectory data that aim to manage privacy data risks associated with their services, among other uses.

Location-based services (LBS) such as real-time traffic information, fleet management, and navigation among others, are based on the analysis of mobility and/or trajectory data that users of such services provide. LBS uses analysis of trajectory data that users of such services provide such as pick-up/drop-off analysis. Trajectory data is associated to an accuracy value: the quality of the data provided by the users to the LBS, in terms of accuracy of the service and freshness. Trajectory data is also associated to a privacy value, as it may reveal sensitive information about data subjects that produced the trajectories. Data such as behavioral patterns, habits, visits to sensitive locations such as a home or hospital, etc. LBS providers wish to maximize the utility of the collected data, which in turn maximizes the accuracy of the LBS, while at the same time wanting to minimize the associated risks for the privacy of users related to the inadvertent disclosure or misuse of the data.

To balance or optimize the trade-off between privacy and utility, both quantities first need to be measured. While measuring utility is straightforward as the accuracy of a service is an objective quantity that can be estimated, measuring privacy is complicated by the many factors that influence it, such as behavioral patterns in the data that can act as quasi-identifiers. Existing measures of privacy for location data cannot effectively be used for trajectory data.

Embodiments described herein provide a general measure of privacy for trajectory data that works independently of whether and how the data is anonymized. Embodiments adapt standard measures of k-anonymity, l-diversity, and in some instances t-closeness for trajectory data. Embodiments use a threat model that employs the concept of equivalence areas which are regions where the adversary is unable to distinguish between trajectories. The adversary of models used herein is presumed to be an 'approximate locator' whose knowledge about the target location has limited accuracy. The adversary might know the home address of the target, but might not know exactly where the target parked and/or when exactly the target drove away. Embedding uncertainty in the threat model allows the model to be more realistic, adaptable, and flexible. Embodiments are realistic as they allow for imprecisions (e.g., caused by GPS error), adaptable as the privacy risk can be estimated independently of a type of anonymization, and flexible as they support adversaries with a broad range of abilities.

Embodiments provided herein define a novel threat model for location data privacy in which the adversary has imperfect knowledge about the target. Equivalence areas are used to model the ability of the adversary at discriminating between locations. Quasi-identifiers are used with sensitive attributes for trajectory data that is based on context and semantics of location data.

Trajectory data as described herein is defined as a set of data points, each data point including a location and a timestamp. The location may be in the form of latitude and longitude, and potentially altitude. Additional information may be associated with a data point, such as speed, heading, etc. If a trajectory identifier is associated with each point, the trajectory data can be partitioned into a set of trajectories, each of which identifies the movement of a user over a period of time.

Location-based service providers may provide trajectory data to customers, such as municipalities interested in traffic optimization, data producers (e.g., drivers who share their trajectory data with the service provider), or the like. Any trajectory that reveals a user's behavioral patterns (e.g., going from A to B) can potentially reveal privacy-sensitive information and locations. A trajectory dataset is a set of trajectories $T=\{tr_1, \ldots tr_n\}$, each $tr_i=\{p_i^1, \ldots p_i^m\}$, $|tr_i|=m$ is an ordered set of tuples that can be termed records. Trajectory $tr_i$ is associated to a pseudonym $ID_i$ that allows identification of all records in that trajectory. FIG. 5 provides a table defining the symbols used herein. Each record is defined as $p_i^j=<t_j, s_j, ID_i, y_j>$, where $t_j$ is the time component (e.g., a timestamp), $s_j$ is the spatial component (e.g., a set of coordinates), $ID_i$ is the pseudonym of trajectory $tr_i$ to which $p_i^j$ belongs, and $y_j$ is a set of additional attributes of the record, such as a speed of the vehicle. The pseudonym of the trajectory, $ID_i$ and the additional attributes $y_j$ are presumed to lack any individually-identifying information contained therein.

A quasi-identifier, as used herein, defines attributes whose values can be linked to external information to re-identify the target. For example, combining age and address with public information like phone records or tax records, could allow re-identification of a record in the data to a specific person. When dealing with location data, consideration must be given to the semantic aspect of location information that can act as a quasi-identifier. Contextual information about nearby points of interest, time of day, or the like, or where two parking lots may be associated with different hospitals, but are associated with the same purpose at the semantic level. Even if considering the semantic aspect of location, defining quasi-identifiers for trajectory data is not a trivial task, as any behavioral pattern may be used to re-identify an individual. Behavioral patterns can be defined by spatio-temporal constraints, such as being at a certain address in the evenings, and additionally by a recurrence formula such as a pattern that repeats daily.

An equivalence class is defined herein as a set of records that match on the quasi-identifiers. In principle an equivalence class contains all records that are indistinguishable, given a certain background knowledge (BK) such as an adversary whose background knowledge about a target matches with an equivalence class, is not able to re-identify a specific record among those in the equivalence class. In the context of location data, an equivalence class is referred to as an equivalence area $eq_a=\{<t_a^1, s_a^1>, \ldots, <t_a^l, s_a^l>\}$, which is a sequence of spatio-temporal coordinates defining a polyhedron in space and in time. The notation $p_i^j \in eq_a$ is the notation that a record $p_i^j$ is contained in the polyhedron $eq_a$.

Computing equivalence areas uses a definition of matching or equality between quasi-identifiers, which is not trivial to define for location and trajectory data as it is based on the semantic meaning of locations. A definition of equivalence area deals with uncertainty as the semantic meaning of a location is not absolute, unique, or certain. For example, probe data locations near a housing complex are likely related to any of the residents or even to visitors of the complex.

FIG. 3 illustrates example embodiments of equivalence areas associated with different definitions of background knowledge. Background knowledge of a home address 300 with imprecise equivalence is illustrated in image 302. The imprecise equivalence area 312 is a polygon including a plurality of possible parking locations including parking lots and on-street parking. Background knowledge of a home address 300 with precise equivalence is illustrated in image 304. The precise equivalence area 314 is a polygon including the property of the home address where the target has private parking.

A sensitive attribute is described herein as an attribute of the dataset that contains sensitive information about an individual. When dealing with location or trajectory data, a sensitive attribute could be the semantic meaning associated to a location (e.g., the home address) or to a behavioral pattern (e.g., a frequency of visits to a gym). According to an example embodiment, the origin and destination of a trajectory may be considered sensitive attributes. The origin and destination are sensitive for the analysis of pick-up/drop-off (PUDO) pairs. Additional attributes could be present, such as way points, multi-legged trips, etc., but they may not need to be modeled for purposes described herein. However, these attributes could be addressed in the framework described herein by using each leg of a multi-legged trip as a separate trajectory, for example.

Generally, an adversary uses background knowledge about the quasi-identifiers to infer a distinct set of sensitive attributes. A peculiarity of a trajectory is that the distinction between quasi-identifiers and sensitive attributes may be blurred, as depending on the adversary's background knowledge, the same attribute can be both types. For example, a target generates a trajectory that goes from home to work, and the adversary has background knowledge about the home address of the target. The origin of the trajectory acts as a quasi-identifier as it associates the trajectory to the target's identity, and the work address acts as a sensitive attribute as it reveals privacy-sensitive information about the target. If the adversary has background knowledge about the work address instead, inference could be made about the home address of the target. FIG. 4 illustrates an example embodiment of the double nature of location data. A target 400 travels along a trajectory 402 from a home location 404 to a work location 406. The same trajectory 402 could reveal the target's 400 work location 406 (sensitive attribute) to an adversary that knows the target's home location 404 (quasi-identifier) as shown at 414 or vice versa, where the adversary can identify the target's home location 404 (sensitive attribute) based on the trajectory 402 and knowing the target's work location 406 (quasi-identifier).

An example embodiment is described herein under the assumption that an adversary has background knowledge about the origin of a trip; hence, the origin $tr_i^o=p_i^l$ acts as quasi-identifier and the destination $tr_i^D=p_i^m$ acts as sensitive attribute. Embodiments hold true even if the roles are reversed. FIG. 5 provides a table of symbol definitions as described and used herein.

The set of trajectories that match with an equivalence area $eq_a$, e.g., whose quasi-identifier is in the area, is defined as $M_a=\{tr_x: tr_x^o \in eq_a\}$, $|M_a|=k_a$ (see FIG. 6). According to FIG. 6, trajectories that match with an equivalence area are shown in solid lines while trajectories that do not match with an equivalence area are shown in dotted lines. Equivalence areas may optionally be defined around points-of-interest. For example, as shown in FIG. 7, points-of-interest may each include a defined equivalence area. Each of those equivalence areas may be associated with some semantic information such as the type of point-of-interest, which can reveal sensitive information about the target. As shown in FIG. 7, for equivalence area 702, there are four matched trajectories: 704, 706, 708, 710. One of the trajectories, 708, ends in an equivalence area containing a store, trajectory 710 ends in an equivalence area defined by or associated with a bank, and two trajectories 704, 706, end in equivalence areas defined by or associated with hospitals that are spatially separated but semantically equivalent.

According to an example model, an adversary seeks to gain sensitive information about a specific individual from accessing trajectory data. The adversary may be an "honest-but-curious" location-based service provider such as a data scientist employee or an independent individual or organization (e.g., an investigator). This model assumes that the adversary possesses (limited) background knowledge about the target. This background knowledge allows the adversary to define a "semantic region" that acts as quasi-identifier (e.g., all roads within five minutes walking from the target's home on which parking is possible). The adversary is assumed to have access to some additional data source that allows them to link this background knowledge to regions of the map (e.g., information about points of interest, the road network, population density, address directory, etc.). The dataset is assumed to contain one trajectory that has been produced by the target as if this is not the case, re-identification risk would be null.

The model of this example embodiment, while specific to the metric of k-anonymity, further assumes that each trajectory in the dataset is generated by a different person. This ensures that a higher k translates to a higher privacy. If the target could have possibly generated all trajectories in the data, every value of k would result in the same level of privacy (i.e., perfect re-identification). This assumption is realistic if the dataset contains trajectories that have been created within a limited time window, such as eight hours, for example. The adversary is assumed to have access to the trajectory data. By correctly re-identifying the target's trajectory, the adversary can gain sensitive information about the target which they do not already know. For example, the adversary might know the home address of the target and, by re-identifying the trajectory produced by the target, might be able to infer the address of the target's workplace.

In practical terms, an attack would be performed as follows: the adversary identifies potentially target-identifying information (e.g., a geographic location/area, a trajectory, etc.) based on their background knowledge about the target, which acts as a quasi-identifier; the adversary identifies a set of trajectories that match the target's potentially target-identifying information which results in determination of the target's re-identification risk; the adversary performs inference on the values taken to be the sensitive attributes of the matched trajectories resulting in determination of the target's inference risk. While the aforementioned model is specific to the metric of k-anonymity, embodiments may be used with other metrics in lieu of or in addition to k-anonymity. For example, the metrics of L-diversity or T-closeness may be used.

The threat model presented above defines an attacker with background knowledge about a specific target individual. When evaluating the risk of a dataset, consideration is given for the risk for all individuals associated to the trajectory data when targeted by an attacker with arbitrary background knowledge about them. Considering all of these theoretical combinations is not feasible such that according to example embodiments, a simpler method is employed to estimate this risk.

Embodiments provided herein model the adversary ability as the accuracy of defining equivalence areas, where a more skilled adversary would be able to produce smaller, more precise equivalence areas. For example, a skilled adversary would consider for re-identification all trajectory matching with the address of the target's home, while a less skilled adversary would consider all trajectories matching within the neighborhood as shown in FIG. 8. The definition of equivalence classes can be arbitrarily complex, from a simple spatio-temporal grid to a more complex definition that considers contextual information such as population density, road network, points of interest, categories of points of interest, etc. Embodiments of this model introduce an implicit constraint on the risk assessment: increasing the size of equivalence areas leads to lower privacy risks while at the same time constraining the validity of the results to less capable adversaries.

FIG. 8 illustrates equivalence areas obtained by differently skilled adversaries. A relatively inaccurate adversary may know the target address 800, but may not know their parking habits, such that the inaccurate adversary may consider a large area covering multiple parking options where the target may park, illustrated by the dotted-line border 802. A more precise adversary may know that the target typically parks on the streets and thus define a smaller area that covers nearby roads, illustrated by dashed-line border 804. A skilled adversary may know that the street where the target lives has reserved parking spots for residents, thus is able to reduce the area down to a block, illustrated by solid border 806. The measure of k-anonymity is a measure of re-identifiability or an adversary's ability to identify the source of a trajectory. Re-identifiability decreases with an increasing number of records such as trajectories that are indistinguishable with respect to some background knowledge. Given an equivalence area defined by the background knowledge, each of the k trajectories in the equivalence area is k-anonymous or has k-anonymity=k. If assumptions described in a threat model hold a 1-anonymous trajectory can be re-identified with certainty to the adversary's target, while in the case of a 3-anonymous trajectory, the adversary can determine that the target generated any of these three trajectories with only 33% likelihood.

K-anonymity measures privacy gains against a passive adversary that does not attempt to analyze the numerous trajectories or attempt to decipher which trajectory belongs to the target. An active adversary that has access to no additional background knowledge can further undermine the target's privacy by performing a homogeneity attack that looks at the frequency of values in the sensitive attribute in order to infer the likelihood that each value is the correct one. For example, if the sensitive attribute takes on the same unique value in all re-identified records, the adversary can be certain about the value of the target's sensitive attribute without needing to know which of the records is the correct one.

FIG. 9 illustrates an example embodiment of an attack scenario from an adversary attempting to associate a trajectory with a target (e.g., a user or a device). As shown, the adversary has a target and has some background knowledge about the target, such as the home address represented by 902. The adversary is able to associate trajectories in the dataset of probe data with the target through re-identification by matching them based on the background knowledge. The adversary can identify all trajectories that start at or near the target's home address as associated with the target. The adversary is able to infer new information about the target from the re-identified trajectories, such as the destination 904 of a trajectory 906 that began at the home address 902 of the target.

Embodiments described herein model the adversary acknowledging that the adversary can target any trajectory in the dataset. The ability of the adversary to re-identify trajectories may be modeled using equivalence areas. The target is associated to a specific equivalence area, and all trajectories contained in that area may be re-identified with the target. The adversary is unable to distinguish between trajectories in the equivalence area. If the adversary has very precise background knowledge, such as if the adversary observes the target at a specific address, the equivalence area may be small; however, if the adversary is imprecise the equivalence area will be considerably larger. FIG. 3, described above, illustrates such an embodiment.

FIG. 10 illustrates an example embodiment in which an equivalence area 1002 exists for a target's origin 1004. Within the equivalence area 1002 of the target's origin 1004 exist the origins 1006 of other trajectories. An adversary cannot re-identify the target's origin 1004 within the equivalence area with certainty due to the presence of the other trajectory origins 1006.

According to embodiments described herein, a privacy score can be generated between a first dataset and a second dataset to establish a privacy risk of disclosure of the dataset. To establish this score, the privacy risk of various scenarios is identified and used to increase or decrease a cumulative, aggregate score for the privacy risk of a second dataset relative to a first dataset. Privacy risks are introduced when re-identification of a target can be established from the dataset, such as when no other origins exist within the equivalence area. Further, privacy risk is introduced when inference can be made regarding a destination. When re-identification of a target is correct, but an inference is wrong, new wrong information is inferred about the target. When re-identification of a target is wrong, but inference is correct, new correct information is inferred about an entity other than the target. When re-identification of a target is wrong, and inference is also wrong, new wrong information is inferred about an entity other than the target.

Privacy risk may not be introduced if a trajectory cannot be re-identified to any particular target, such as an individual or a particular device. When multiple trajectories are present produced by a plurality of people there is a lower privacy risk. To quantify the privacy risk a privacy risk value is established for features common between datasets of probe data. As shown above, an origin of a first dataset sharing the same equivalence area as an origin of a second dataset, privacy risks exist. Equivalence areas in the raw data (e.g., a first dataset) may be identified to help determine what can be re-identified. Each equivalence area can be assigned a value of k-anonymity and l-diversity to model uncertainty of re-identification and inference. The anonymized data, which may be anonymized through any of a plurality of anonymization algorithms, such as splitting and gapping, splitting and gapping with negative gaps, origin and destination chopping, or the like. Further, the anonymization algorithm may be applied using differing parameters (e.g., sub-trajectory and/or gap length for splitting and gapping, for example). The anonymized dataset is mapped to the same areas as the first dataset and k-anonymity and l-diversity of the anonymized data may be computed without considering the raw data when computing the privacy risk scores. A total score may be computed for a trajectory that includes an aggregation of the privacy risk scores for features of the dataset.

FIG. 11 illustrates a table of scenarios and the respective privacy score afforded each scenario according to an example embodiment of the present disclosure. As shown in Row 1, with raw dataset having a value of k=1, the source of the risk of the raw data is re-identification. The anonymized data similarly has a score of k=1 for Row 1 also exhibiting a re-identification risk, such that the score is zero. In Row 2, the raw dataset and the anonymized dataset have a value of k greater than one indicating multiple trajectories, resulting in a score of zero. For Row 3, the raw data includes a value of k=1 such that re-identification is a risk; however, the anonymized data has a value of k greater than one indicating multiple trajectories, resulting in a score of one. For Row 4, the value of k in the raw data is greater than one; however, the anonymized data includes a value of k=1 such that the re-identification presents a privacy risk and the score is negative one. While the illustrated table relates only to analysis of data using k-anonymization, the table of FIG. 11 could optionally include l-diversity and/or t-closeness in identifying the risk of the target being identified by the dataset. The metrics of k-anonymization, l-diversity, and t-closeness could be used independently or in any combination to generate a score as identified in FIG. 11.

FIG. 12 illustrates an example embodiment of a positive privacy change whereby the equivalence area of the anonymized origin 1024 is different from the equivalence area 1002 of the target origin 1004, and a plurality of other trajectory origins 1030 exist around the target origin. This presents a low likelihood of correlating the anonymized trajectory origin 1024 with the target origin 1004 providing a low likelihood of re-identification and improving the privacy score. FIG. 13 illustrates another example embodiment of an improvement to the privacy score through anonymization whereby after anonymization, several trajectory origins 1030 are within the same equivalence area as the target origin 1004 rendering re-identification difficult. Further, a second equivalence area 1012 for the destination is established such that inference is difficult. The anonymization depicted in FIG. 13 provides a privacy improvement as additional trajectories within the origin equivalence area 1002 is better for privacy, while multiple destination equivalence areas 1012 are better for privacy.

FIG. 14 illustrates a negative privacy change whereby before anonymization, the raw data includes an origin 1004 within an equivalence area 1002 proximate another trajectory origin 1030 and proximate another equivalence area 1028 having another trajectory origin 1030. The destination 1014 is within an equivalence area 1012 proximate another trajectory destination 1032 within the same equivalence area 1012, and one in another equivalence area. However, after anonymization, the anonymized origin 1024 is within its own equivalence area 1028 resulting in a re-identification risk and the destination 1026 yields an inference risk.

The calculated privacy score for a dataset may be used to determine if it is sufficiently anonymized to be released for use by entities such as location-based service providers. The privacy score identifies the risk of the dataset being associated with the target entity that generated the dataset. A predetermined threshold may be established to determine whether or not a dataset should be released. If the privacy score satisfies the predetermined threshold, the dataset may be released for use by third-party entities that may provide services such as location-based services. If the privacy score fails to satisfy the predetermined threshold, the dataset may not be released and may be discarded. Optionally, if the privacy score fails to satisfy the predetermined threshold, anonymization may be performed on the dataset or the raw dataset from which the dataset was generated to obtain a revised dataset. Anonymization may be performed through an anonymization algorithm. If the original dataset was generated through anonymization of the raw dataset using an anonymization algorithm, parameters of the anonymization algorithm may be tuned such that using the anonymization algorithm on the raw dataset generates the revised dataset from which a revised privacy score is calculated. These parameters that may be changed and/or tuned may include gap sizes and/or sub-trajectory sizes in a splitting and gapping algorithm, for example. Optionally, a different anonymization algorithm may be used on the raw dataset to generate the revised dataset.

The predetermined threshold may be adjustable or may vary based on mitigating factors. For example, a predetermined threshold may be lowered by a user who is unconcerned or less concerned with data privacy. A predetermined threshold may vary in dependence of the intended use of the dataset. For example, a dataset that will be used for user-specific location-based services tailored to the user may have a lower predetermined threshold as privacy may be less of a concern, while a dataset that will be widely disseminated or used by potential adversaries may be subject to a substantially higher predetermined threshold.

Embodiments described herein improve the ability to balance privacy with utility as embodiments establish a method of generating a privacy score for trajectory data. FIG. 15 illustrates a flowchart depicting a method according to an example embodiment of the present disclosure. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 15 illustrates a method of generating a privacy score for a trajectory dataset relative to another trajectory dataset. In the illustrated embodiment, a dataset of probe data points defining a trajectory is received at 1100. The set of probe data points may be received, for example, by an OEM 104 from a vehicle or mobile device 114. The probe data points may include a location (e.g., latitude and longitude), a time stamp, and an indication of the utility of the probe data point which may include an indication of the observations at the probe data point, for example. A second dataset of probe data points is received at 1110. The second dataset of probe data points may include an anonymized dataset, whereby the first dataset is anonymized through an anonymization algorithm to generate the second dataset. Optionally, the first dataset is a raw dataset of probe data points and the second dataset is a raw dataset of probe data points. At 1120, a plurality of features common to the first dataset and the second dataset are identified. These features may include, for example, equivalence areas defined in the map data and trajectory information. At 1130, a privacy risk value is computed for the identified features common to the first dataset and the second dataset. The privacy risk values for the identified features common to the first dataset and the second dataset are aggregated at 1140, and an aggregate privacy risk score between the first dataset and the second dataset is computed at 1150. The aggregate privacy risk score provides an indication of the likelihood that an adversary can accurately identify the source of the second dataset presuming that the adversary has some degree of background knowledge of the source.

In an example embodiment, an apparatus for performing the method of FIG. 15 above may comprise a processor (e.g., the processor 202) configured to perform some or each of the operations (1100-1150) described above. The processor may, for example, be configured to perform the operations (1100-1150) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 1100-1150 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer program code, the at least one memory and computer program code configured to, with the processor, cause the apparatus to at least:

receive a first dataset of probe data points defining a trajectory;
receive a second dataset of the probe data points defining the trajectory;
identify a plurality of features common to the first dataset and the second dataset, wherein the features common to the first dataset and the second dataset comprise equivalence areas, wherein equivalence areas comprise spatio-temporal regions for an origin and a destination of the first dataset and the second dataset;
compute a privacy risk value for the identified features common to the first dataset and the second dataset;
aggregate the privacy risk values for the identified features common to the first dataset and the second dataset;
compute an aggregate privacy risk score between the first dataset and the second dataset; and
in response to the aggregate privacy risk score between the first data set and the second data set satisfying a predetermined value, release the second dataset to a third-party entity to provide location-based services using the second dataset.

2. The apparatus of claim 1, wherein the second dataset of the probe data points defining the trajectory is an anonymized dataset anonymized using a first anonymization algorithm, wherein the apparatus is further caused to:
in response to the aggregate privacy risk score failing to satisfy the predetermined value, provide for anonymization of the first dataset of probe data points using a second anonymization algorithm to generate an anonymized third dataset.

3. The apparatus of claim 1, wherein the apparatus is further caused to:
receive location-based services in response to release of the second dataset.

4. The apparatus of claim 1, wherein the plurality of features comprise the equivalence areas and trajectories.

5. The apparatus of claim 1, wherein causing the apparatus to compute a privacy risk value for the features common to the first dataset and the second dataset comprises causing the apparatus to:
conduct a pair-wise comparison of privacy risk values between the first dataset and the second dataset inside the identified equivalency areas; and
wherein causing the apparatus to aggregate the privacy risk values for the identified features common to the first dataset and the second dataset comprises causing the apparatus to aggregate a result of the pair-wise comparison of privacy risk values between the first dataset and the second dataset.

6. A computer program product comprising at least one non-transitory computer-readable storage medium having computer-executable program code portions stored therein, the computer-executable program code portions comprising program code instructions configured to:
receive a first dataset of probe data points defining a trajectory;
receive a second dataset of the probe data points defining the trajectory;
identify a plurality of features common to the first dataset and the second dataset, wherein the features common to the first dataset and the second dataset comprise equivalence areas, wherein equivalence areas comprise spatio-temporal regions for an origin and a destination of the first dataset and the second dataset;
compute a privacy risk value for the identified features common to the first dataset and the second dataset;
aggregate the privacy risk values for the identified features common to the first dataset and the second dataset;
compute an aggregate privacy risk score between the first dataset and the second dataset; and
in response to the aggregate privacy risk score between the first data set and the second data set satisfying a predetermined value, release the second dataset to a third-party entity to provide location-based services using the second dataset.

7. The computer program product of claim 6, wherein the second dataset of the probe data points defining the trajectory is an anonymized dataset anonymized using a first anonymization algorithm, wherein computer program product further comprises program code instructions configured to:
in response to the aggregate privacy risk score failing to satisfy the predetermined value, provide for anonymization of the first dataset of probe data points using a second anonymization algorithm to generate an anonymized third dataset.

8. The computer program product of claim 6, further comprising program code instructions configured to:
receive location-based services in response to release of the second dataset.

9. The computer program product of claim 6, wherein the plurality of features comprise the equivalence areas and trajectories.

10. The computer program product of claim 6, wherein the program code instructions to compute a privacy risk value for the features common to the first dataset and the second dataset comprise program code instructions to:
conduct a pair-wise comparison of privacy risk values between the first dataset and the second dataset inside the identified equivalency areas; and
wherein the program code instructions to aggregate the privacy risk values for the identified features common to the first dataset and the second dataset comprise program code instructions to aggregate a result of the pair-wise comparison of privacy risk values between the first dataset and the second dataset.

11. A method comprising:
receiving a first dataset of probe data points defining a trajectory;
receiving a second dataset of the probe data points defining the trajectory;
identifying a plurality of features common to the first dataset and the second dataset, wherein the features common to the first dataset and the second dataset comprise equivalence areas, wherein equivalence areas comprise spatio-temporal regions for an origin and a destination of the first dataset and the second dataset;
computing a privacy risk value for the identified features common to the first dataset and the second dataset;
aggregating the privacy risk values for the identified features common to the first dataset and the second dataset;
computing an aggregate privacy risk score between the first dataset and the second dataset; and
in response to the aggregate privacy risk score between the first data set and the second data set satisfying a predetermined value, releasing the second dataset to a third-party entity to provide location-based services using the second dataset.

12. The method of claim 11, wherein the second dataset of the probe data points defining the trajectory is an anonymized dataset anonymized using a first anonymization algorithm, wherein the method further comprises:

in response to the aggregate privacy risk score failing to satisfy the predetermined value, providing for anonymization of the first dataset of probe data points using a second anonymization algorithm to generate an anonymized third dataset.

* * * * *